(12) United States Patent
Ruckle et al.

(10) Patent No.: US 11,324,156 B2
(45) Date of Patent: *May 10, 2022

(54) GANG ANGLE ADJUSTMENT FOR A WORK MACHINE AND METHOD THEREOF

(71) Applicant: DEERE & COMPANY, Moline, IL (US)

(72) Inventors: Jarrod R. Ruckle, Bondurant, IA (US); Andrew J. Peterson, Ankeny, IA (US); Shawn J. Becker, Centralia, KS (US); Mark D. Beeck, Ankeny, IA (US); Brian J. McEvoy, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 377 days.

This patent is subject to a terminal disclaimer.

(21) Appl. No.: 16/509,577

(22) Filed: Jul. 12, 2019

(65) Prior Publication Data

US 2020/0053947 A1 Feb. 20, 2020

Related U.S. Application Data

(60) Provisional application No. 62/764,738, filed on Aug. 15, 2018.

(51) Int. Cl.
*A01B 63/32* (2006.01)
*A01B 5/04* (2006.01)
(Continued)

(52) U.S. Cl.
CPC ............... *A01B 63/32* (2013.01); *A01B 5/04* (2013.01); *A01B 63/002* (2013.01); *A01B 63/30* (2013.01);
(Continued)

(58) Field of Classification Search
CPC ....... A01B 63/30; A01B 63/32; A01B 63/002; A01B 5/04; A01B 76/00; A01B 49/027; A01B 73/044; E02F 9/2271
See application file for complete search history.

(56) References Cited

U.S. PATENT DOCUMENTS 2,580,100 A * 12/1951 Johansen et al. ...... A01B 63/32
280/414.5
4,176,721 A * 12/1979 Poggemiller et al. . A01B 63/22
111/903

(Continued)

OTHER PUBLICATIONS

"Dynamically Adjustable Tillage System from Gates Manufacturing" Successful Farming, https://www.agriculture.com/machinery/precision-agriculture/dynamically-adjustable-tillage-system_234-ar49223; By Jessie Scott, Dated Jun. 16, 2015; pp. 1-9.

(Continued)

*Primary Examiner* — Tara Mayo-Pinnock
(74) *Attorney, Agent, or Firm* — Taft Stettinius & Hollister LLP; Stephen F. Rost

(57) ABSTRACT

An agricultural implement includes a transversely extending frame forming at least a first frame section, a second frame section, and a third frame section, where the first frame section is disposed between the second and third frame sections. A pair of elongated gang assemblies are on the first frame section, an elongated gang assembly is on the second frame section, and an elongated gang assembly is on the third frame section. Each of the gang assemblies is horizontally adjustable relative to the frame. An actuator for each gang assembly operably controls the angular adjustment of the gang assemblies, and a fluid source supplies fluid to the actuators. The actuator on the second frame section is a master actuator for one of the actuators on the first frame (Continued)

section, and the actuator on the third frame section is a master actuator for the other actuator on the first frame section.

20 Claims, 11 Drawing Sheets

(51) Int. Cl.
    *A01B 63/30*     (2006.01)
    *A01B 76/00*     (2006.01)
    *A01B 63/00*     (2006.01)
    *E02F 9/22*     (2006.01)
    *A01B 49/02*     (2006.01)
    *A01B 73/04*     (2006.01)

(52) U.S. Cl.
    CPC ............ *A01B 76/00* (2013.01); *E02F 9/2271* (2013.01); *A01B 49/027* (2013.01); *A01B 73/044* (2013.01)

(56) References Cited

U.S. PATENT DOCUMENTS

| | | | |
|---|---|---|---|
| 4,646,620 A * | 3/1987 | Buchl | ................... F15B 15/24 172/4 |
| 6,612,381 B2 | 9/2003 | Powell et al. | |
| 8,534,374 B2 | 9/2013 | Hake et al. | |
| 9,282,688 B2 | 3/2016 | Casper et al. | |
| 9,554,098 B2 | 1/2017 | Casper et al. | |
| 9,668,399 B2 | 6/2017 | Gates | |
| 9,961,823 B2 | 5/2018 | Sporrer et al. | |
| 2017/0112043 A1 | 4/2017 | Nair et al. | |

OTHER PUBLICATIONS

"A Full Line of Light Tillage and Attachment Products" https://www.gatesmfg.net/; Exact publication date unknown but publicly available at least as early as Jun. 11, 2019; pp. 1-10.

\* cited by examiner

GANG ANGLE ADJUSTMENT FOR A WORK MACHINE AND METHOD THEREOF

RELATED APPLICATIONS

This application claims the benefit of U.S. Provisional Patent Application Ser. No. 62/764,738, filed Aug. 15, 2018, the disclosure of which is hereby incorporated by reference in its entirety.

FIELD OF THE DISCLOSURE

The present disclosure relates to controlling tillage equipment, and in particular to a hydraulic control system for controlling gang angle of an implement of a work machine.

BACKGROUND OF THE DISCLOSURE

In the agricultural industry, wide implements such as field cultivators and the like include a main frame and adjacent outrigger or wing frames that are hinged or pivotally coupled thereto. The main frame and adjacent wing frames may include gangs of different shaped coulters or discs for cutting through a ground surface.

It is desirable to be able to adjust the gang angle of the different gangs from an operator's seat of a towing vehicle such as a tractor. This type of control may be achieved by hydraulic, electric or other forms of control. It is, however, difficult to achieve accurate control of the gang angle between opposite sides of the work machine. Thus, there is a need for an improved control system for controlling gang angle of an implement on a work machine.

SUMMARY

In one embodiment of the present disclosure, an agricultural implement includes a transversely extending frame forming at least a first frame section, a second frame section, and a third frame section, where the first frame section is disposed between the second and third frame sections; a pair of elongated, generally end-to-end gang assemblies on the first frame section, an elongated gang assembly on the second frame section, and an elongated gang assembly on the third frame section, each of the gang assemblies including a plurality of rotatable tillage tools mounted in such a manner that their axes of rotation extend substantially transverse to a path of travel of the frame; each of the gang assemblies being horizontally adjustable relative to the frame for adjusting the angles between the path of travel of the frame and the axes of rotation of the tools; a hydraulic actuator for each gang assembly for operably controlling the angular adjustment of the gang assemblies; and a fluid source for supplying hydraulic fluid to the hydraulic actuators; wherein, the hydraulic actuator on the second frame section comprises a master hydraulic actuator for one of the hydraulic actuators on the first frame section, and the hydraulic actuator on the third frame section comprises a master hydraulic actuator for the other hydraulic actuator on the first frame section.

In one example of this embodiment, the fluid source is fluidly coupled in series with each of the hydraulic actuators. In a second example, each hydraulic actuator comprises a cylinder and piston rod that extends and retracts within a bore of the cylinder; each cylinder comprises an equal bore size. In a third example, a gang linkage is operably interconnected between the pair of gang assemblies on the first frame section for synchronizing the pair of gang assemblies during their angular adjustment.

In a fourth example of this disclosure, the implement may include a reservoir of hydraulic fluid disposed in fluid communication with the fluid source; and a fluid path defined between the fluid source and the reservoir; wherein, hydraulic fluid flows through the flow path such that the hydraulic fluid is directly supplied to a hydraulic actuator on the second frame section and a hydraulic actuator on the third frame section, and hydraulic fluid flows to the reservoir via a return line directly fluidly coupled to another hydraulic actuator on the second frame section and another hydraulic actuator on the third frame section.

In another embodiment of the present disclosure, an agricultural implement includes a transversely extending frame forming at least a first frame section, a second frame section, and a third frame section, where the first frame section is disposed between the second and third frame sections; a front pair of elongated, generally end-to-end gang assemblies on the first frame section, a rear pair of elongated, generally end-to-end gang assemblies on the first frame section, a front elongated gang assembly on the second frame section, a rear elongated gang assembly on the second frame section, a front elongated gang assembly on the third frame section, and a rear elongated gang assembly on the third frame section, each of the gang assemblies including a plurality of rotatable tillage tools mounted in such a manner that their axes of rotation extend substantially transverse to a path of travel of the frame; each of the gang assemblies being horizontally adjustable relative to the frame for adjusting the angles between the path of travel of the frame and the axes of rotation of the tools; a hydraulic actuator for each gang assembly for operably controlling the angular adjustment of the gang assemblies; and a fluid source for supplying hydraulic fluid to the hydraulic actuators; wherein, one of the hydraulic actuators on the second frame section comprises a master hydraulic actuator for two of the four hydraulic actuators on the first frame section, and one of the hydraulic actuators on the third frame section comprises a master hydraulic actuator for the other two hydraulic actuators on the first frame section.

In a first example of this embodiment, the fluid source is fluidly coupled in series with each of the hydraulic actuators. In a second example, each hydraulic actuator comprises a cylinder and piston rod that extends and retracts within a bore of the cylinder; each cylinder comprises an equal bore size. In a third example, the implement includes a gang linkage operably interconnected between the rear pair of gang assemblies on the first frame section for synchronizing the rear pair of gang assemblies during their angular adjustment.

In a fourth example of this embodiment, the implement may include a reservoir of hydraulic fluid; and a return line fluidly coupled to the other hydraulic actuators on the second and third frame sections, wherein hydraulic fluid returns to the reservoir via the return line. In a fifth example, each of the hydraulic actuators for controlling the front gang assemblies on the frame move in an opposite direction for angular adjustment than each of the hydraulic actuators for controlling the rear gang assemblies. In a sixth example, a hydraulic control system includes the fluid source, a fluid reservoir, the hydraulic actuator for each gang assembly, and a plurality of fluid lines fluidly coupling the fluid source to each hydraulic actuator in series.

In another example of the present disclosure, the hydraulic actuator includes a first hydraulic actuator for controlling angular adjustment of the rear elongated gang assembly on the second frame section; a second hydraulic actuator for controlling angular adjustment of the front elongated gang assembly on the second frame section; a third hydraulic actuator for controlling angular adjustment of the rear elongated gang assembly on the third frame section; a fourth hydraulic actuator for controlling angular adjustment of the front elongated gang assembly on the third frame section; a fifth hydraulic actuator for controlling angular adjustment of a first front gang assembly of the pair of front elongated gang assemblies on the first frame section; a sixth hydraulic actuator for controlling angular adjustment of a second front gang assembly of the pair of front elongated gang assemblies on the first frame section; a seventh hydraulic actuator for controlling angular adjustment of a first rear gang assembly of the pair of rear elongated gang assemblies on the first frame section; and an eighth hydraulic actuator for controlling angular adjustment of a second rear gang assembly of the pair of rear elongated gang assemblies on the first frame section; wherein, the first hydraulic actuator is the master hydraulic actuator of the fifth hydraulic actuator, and the third hydraulic actuator is the master hydraulic actuator of the sixth hydraulic actuator.

In a further example of this disclosure, the fifth hydraulic actuator is a master hydraulic actuator of the seventh actuator, and the seventh hydraulic actuator is a master hydraulic actuator of the second hydraulic actuator; the sixth hydraulic actuator is a master hydraulic actuator of the eighth hydraulic actuator, and the eighth hydraulic actuator is a master hydraulic actuator of the fourth hydraulic actuator. In yet a further example of this disclosure, each hydraulic actuator includes a base end and a rod end. A first hydraulic fluid path is defined between the rod end of the first hydraulic actuator and the rod end of the fifth hydraulic actuator, a second hydraulic fluid path is defined between the rod end of the third hydraulic actuator and the rod end of the sixth hydraulic actuator, a third hydraulic fluid path is defined between the base end of the fifth hydraulic actuator and the base end of the seventh hydraulic actuator, and a fourth hydraulic fluid path is defined between the base end of the sixth hydraulic actuator and the base end of the eighth hydraulic actuator.

In another example of this disclosure, each hydraulic actuator is controllably movable between an extended position and a retracted position, and as each of the hydraulic actuators for controlling the front gang assemblies on the frame is disposed in either the extended or retracted position, each of the hydraulic actuators for controlling the rear gang assemblies is disposed in the other position.

In yet another example of this disclosure, the gang angle is increased when each of the hydraulic actuators for controlling the front gang assemblies on the frame is disposed in the extended position and each of the hydraulic actuators for controlling the rear gang assemblies is disposed in the retracted position; and the gang angle is decreased when each of the hydraulic actuators for controlling the front gang assemblies on the frame is disposed in the retracted position and each of the hydraulic actuators for controlling the rear gang assemblies is disposed in the extended position.

In a further embodiment of the present disclosure, an agricultural implement includes a transversely extending frame forming at least a first frame section, a second frame section, and a third frame section, where the first frame section is disposed between the second and third frame sections; a front pair of elongated, generally end-to-end gang assemblies on the first frame section, a rear pair of elongated, generally end-to-end gang assemblies on the first frame section, a front elongated gang assembly on the second frame section, a rear elongated gang assembly on the second frame section, a front elongated gang assembly on the third frame section, and a rear elongated gang assembly on the third frame section, each of the gang assemblies including a plurality of rotatable tillage tools mounted in such a manner that their axes of rotation extend substantially transverse to a path of travel of the frame; each of the gang assemblies being horizontally adjustable relative to the frame for adjusting the angles between the path of travel of the frame and the axes of rotation of the tools; a first hydraulic actuator for controlling angular adjustment of the rear elongated gang assembly on the second frame section; a second hydraulic actuator for controlling angular adjustment of the front elongated gang assembly on the second frame section; a third hydraulic actuator for controlling angular adjustment of the rear elongated gang assembly on the third frame section; a fourth hydraulic actuator for controlling angular adjustment of the front elongated gang assembly on the third frame section; a fifth hydraulic actuator for controlling angular adjustment of a first front gang assembly of the pair of front elongated gang assemblies on the first frame section; a sixth hydraulic actuator for controlling angular adjustment of a second front gang assembly of the pair of front elongated gang assemblies on the first frame section; a seventh hydraulic actuator for controlling angular adjustment of a first rear gang assembly of the pair of rear elongated gang assemblies on the first frame section; and an eighth hydraulic actuator for controlling angular adjustment of a second rear gang assembly of the pair of rear elongated gang assemblies on the first frame section; and a fluid source for supplying hydraulic fluid to the hydraulic actuators; wherein, the first hydraulic actuator is the master hydraulic actuator of the fifth hydraulic actuator, and the third hydraulic actuator is the master hydraulic actuator of the sixth hydraulic actuator.

In one example of this embodiment, each of the first, second, third, fourth, fifth, sixth, seventh, and eighth hydraulic actuators comprise the same bore size. In another example, each hydraulic actuator is controllably movable between an extended position and a retracted position, and as the second, fourth, fifth and sixth hydraulic actuators are disposed in either the extended or retracted position, the first, third, seventh and eighth hydraulic actuators are disposed in the other position; the gang angle is increased when the second, fourth, fifth and sixth hydraulic actuators are disposed in their extended position and first, third, seventh and eighth hydraulic actuators are disposed in their retracted position; and the gang angle is decreased when the second, fourth, fifth and sixth hydraulic actuators are disposed in their retracted position and the first, third, seventh and eighth hydraulic actuators are disposed in their extended position.

In one embodiment of the present disclosure, an agricultural implement includes a transversely extending frame forming at least a first frame section, a second frame section, and a third frame section, where the first frame section is disposed between the second and third frame sections; a pair of elongated, generally end-to-end gang assemblies on the first frame section, an elongated gang assembly on the second frame section, and an elongated gang assembly on the third frame section, each of the gang assemblies including a plurality of rotatable tillage tools mounted in such a manner that their axes of rotation extend substantially transverse to a path of travel of the respective frame; each of the gang assemblies being horizontally adjustable relative to their respective frame for adjusting the angles between the path of travel of the frame and the axes of rotation of the tools; an actuator for each gang assembly for operably controlling the angular adjustment of the gang assemblies; and a controller disposed in electrical communication with the actuators; wherein, the actuator on the second frame section comprises a master actuator for one of the actuators on the first frame section, and the actuator on the third frame section comprises a master actuator for the other actuator on the first frame section.

In one example of this embodiment, each of the actuators may be controlled independently of the other actuators. In a second example, each actuator comprises a linear electric actuator. In a third example, an electric power source electrically coupled to each actuator for supplying electrical power thereto. In a fourth example, an alternator is disposed in electrical communication with the electric power source.

In a further embodiment of the present disclosure, an agricultural implement includes a transversely extending frame forming at least a first frame section, a second frame section, and a third frame section, where the first frame section is disposed between the second and third frame sections; a plurality of elongated, generally end-to-end gang assemblies on the first frame section, the second frame section, and the third frame section, each of the gang assemblies including a plurality of rotatable tillage tools mounted in such a manner that their axes of rotation extend substantially transverse to a travel direction of the implement; a plurality of hydraulic actuators coupled to the first, second and third frame sections, where each hydraulic actuator is configured to operably control the angular adjustment of one of the plurality of gang assemblies relative to the respective frame section; a fluid source for supplying hydraulic fluid to the plurality of hydraulic actuators; a controller; a first master control valve and a second master control valve, the first and second master control valves being fluidly coupled to the fluid source and the plurality of actuators; and a plurality of sensors coupled to the first, second and third frame sections, the plurality of sensors disposed in electrical communication with the controller.

In one example of this embodiment, a hydraulic actuator on the second frame section comprises a master hydraulic actuator for one of the hydraulic actuators on the first frame section, and a hydraulic actuator on the third frame section comprises a master hydraulic actuator for a different hydraulic actuator on the first frame section. In a second example, the hydraulic actuator on the second frame section is fluidly coupled to the fluid source when the first master control valve is disposed in an open position; the hydraulic actuator on the third frame section is fluidly coupled to the fluid source when the second master control valve is disposed in an open position. In a third example, the first master control valve is operably controlled by the controller independently of the second master control valve.

In a fourth example of this embodiment, a first sensor of the plurality of sensors is coupled to a first actuator on the first frame section; a second sensor of the plurality of sensors is coupled to a second actuator on the first frame section; a third sensor of the plurality of sensors is coupled to an actuator on the second frame section; and a fourth sensor of the plurality of sensors is coupled an actuator on the third frame section. In a fifth example, the fluid source, the first master control valve, a first actuator on the first frame section, and an actuator on the second frame section are fluidly coupled in series to form a first hydraulic circuit; the fluid source, the second master control valve, a second actuator on the first frame section, and an actuator on the third frame section are fluidly coupled in series to form a second hydraulic circuit; further wherein, the first hydraulic circuit and the second hydraulic circuit are hydraulically parallel to one another.

In a sixth example, the plurality of gang assemblies comprises a first gang assembly and a second gang assembly coupled to the first frame section; the plurality of sensors are configured to detect a position of the first, second, and third frame sections and communicate a position signal to the controller based on the position of each frame section; further wherein, the first master control valve or the second master control valve is operably controlled to its open position by the controller until the first gang assembly and the second gang assembly are angularly adjusted to have approximately the same gang angle relative to the travel direction of the implement. In a seventh example, each actuator comprises a cylinder and a rod, the rod moving between a retracted position and an extended position within the cylinder; each of the plurality of sensors being coupled to the rod of a corresponding one of the plurality of actuators.

In another example, the implement may include a first correction valve fluidly coupled between the fluid source and a first actuator on the first frame section, the first actuator being fluidly coupled in series with an actuator on the second frame section; and a second correction valve fluidly coupled between the fluid source and a second actuator on the second frame section, the second actuator being fluidly coupled in series with an actuator on the third frame section; wherein, the controller is in electrical communication with the first and second correction valves. In yet another example, the controller operably actuates the first correction valve to an open position to exhaust hydraulic fluid flowing between the first actuator and the actuator on the second frame section; the controller operably actuates the second correction valve to an open position to exhaust hydraulic fluid flowing between the second actuator and the actuator on the third frame section.

In a further example of this embodiment, the plurality of gang assemblies comprises a front pair of elongated, generally end-to-end gang assemblies on the first frame section, a rear pair of elongated, generally end-to-end gang assemblies on the first frame section, a front elongated gang assembly on the second frame section, a rear elongated gang assembly on the second frame section, a front elongated gang assembly on the third frame section, and a rear elongated gang assembly on the third frame section; the plurality of actuators comprises a first actuator for controlling angular adjustment of the rear elongated gang assembly on the second frame section, a second actuator for controlling angular adjustment of the front elongated gang assembly on the second frame section, a third actuator for controlling angular adjustment of the rear elongated gang assembly on the third frame section, a fourth actuator for controlling angular adjustment of the front elongated gang assembly on the third frame section, a fifth actuator for controlling angular adjustment of a first front gang assembly of the pair of front elongated gang assemblies on the first frame section, a sixth actuator for controlling angular adjustment of a second front gang assembly of the pair of front elongated gang assemblies on the first frame section, a seventh actuator for controlling angular adjustment of a first rear gang assembly of the pair of rear elongated gang assemblies on the first frame section, and an eighth actuator for controlling angular adjustment of a second rear gang assembly of the pair of rear elongated gang assemblies on the first frame section; further wherein, the plurality of sensors are coupled to the second actuator, the fourth actuator, the fifth actuator, and the sixth actuator.

In yet a further example, the first master control valve is fluidly coupled between the fluid source and the second actuator; and the second master control valve is fluidly coupled between the fluid source and the fourth actuator.

In another embodiment of the present disclosure, an agricultural implement includes a transversely extending frame forming at least a first frame section, a second frame section, a third frame section, a fourth frame section, and a fifth frame section, where the first frame section is disposed between the second and third frame sections, the second frame section is disposed between the first and fourth frame sections, and the third frame section is disposed between the first and fifth frame sections; a plurality of elongated, generally end-to-end gang assemblies on the first frame section, the second frame section, the third frame section, the fourth frame section, and the fifth frame section, each of the gang assemblies including a plurality of rotatable tillage tools mounted in such a manner that their axes of rotation extend substantially transverse to a travel direction of the implement; a plurality of hydraulic actuators coupled to the first, second, third, fourth, and fifth frame sections for operably controlling the angular adjustment of the plurality of gang assemblies; a fluid source for supplying hydraulic fluid to the plurality of hydraulic actuators; a controller; a first master control valve and a second master control valve, the first and second master control valves being fluidly coupled to the fluid source and the plurality of actuators; and a plurality of sensors coupled to the first, second, third, fourth, and fifth frame sections, the plurality of sensors disposed in electrical communication with the controller.

In one example of this embodiment, the plurality of hydraulic actuators comprises a first hydraulic actuator for controlling angular adjustment of the rear elongated gang assembly on the second frame section, a second hydraulic actuator for controlling angular adjustment of the front elongated gang assembly on the second frame section, a third hydraulic actuator for controlling angular adjustment of the rear elongated gang assembly on the third frame section, a fourth hydraulic actuator for controlling angular adjustment of the front elongated gang assembly on the third frame section, a fifth hydraulic actuator for controlling angular adjustment of a first front gang assembly of the pair of front elongated gang assemblies on the first frame section, a sixth hydraulic actuator for controlling angular adjustment of a second front gang assembly of the pair of front elongated gang assemblies on the first frame section, a seventh hydraulic actuator for controlling angular adjustment of a first rear gang assembly of the pair of rear elongated gang assemblies on the first frame section, an eighth hydraulic actuator for controlling angular adjustment of a second rear gang assembly of the pair of rear elongated gang assemblies on the first frame section, a ninth hydraulic actuator for controlling angular adjustment of the rear elongated gang assembly on the fourth frame section, a tenth hydraulic actuator for controlling angular adjustment of the front elongated gang assembly on the fourth frame section, an eleventh hydraulic actuator for controlling angular adjustment of the rear elongated gang assembly on the fifth frame section, a twelfth hydraulic actuator for controlling angular adjustment of the front elongated gang assembly on the fifth frame section; the first master control valve being fluidly coupled between the fluid source and the tenth hydraulic actuator, and the second master control valve being fluidly coupled between the fluid source and the twelfth hydraulic actuator.

In another example, the plurality of sensors comprises a first sensor coupled to the tenth hydraulic actuator, a second sensor coupled to the twelfth hydraulic actuator, a third sensor coupled to the seventh hydraulic actuator, and a fourth sensor coupled to the eighth hydraulic actuator; the plurality of sensors are configured to detect a position of the first, second, third, fourth, and fifth frame sections and communicate a position signal to the controller based on the position of each frame section; further wherein, the first master control valve or the second master control valve is operably controlled to its open position by the controller until the first rear gang assembly and the second rear gang assembly of the first frame section are angularly adjusted to have approximately the same gang angle relative to the travel direction of the implement.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
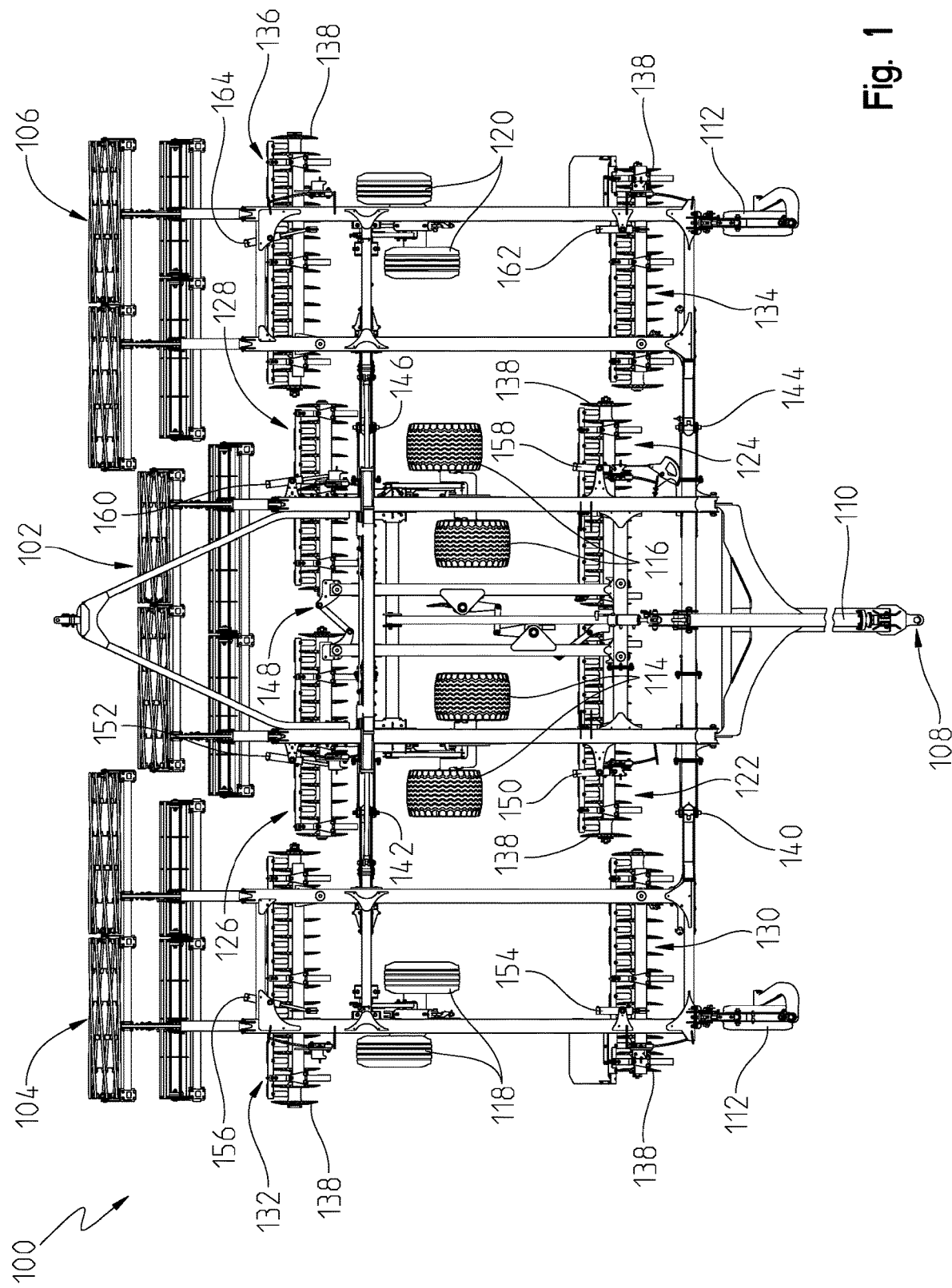
FIG. 1 is an elevated view of a multi-section agricultural implement.

Referring to FIG. 1, an agricultural implement 100 such as a field cultivator is shown. The implement 100 is designed to couple to a work machine (not shown) and perform a work function. For example, the implement may include work tools that penetrate into soil for aerating the soil before planting or uprooting weeds after planting. The implement 100 may be attached to a work machine or tractor (not shown) by a hitch assembly 108 such as a three-point hitch or a drawbar attachment. The hitch assembly 108 includes a hitch frame member 110 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 108 as shown. A first frame section 104 or first wing frame is disposed to one side of the main frame 102, and a second frame section or 106 or second wing frame is disposed to an opposite side thereof. Although not shown, a third frame section may be disposed to an outside of the first inner frame 104, and a fourth frame section may be disposed to an outside of the second inner frame 106.

Each frame section may be pivotable coupled to the frame section adjacent thereto. The first frame second 104, for example, may be pivotable coupled to the main frame 102 at a forward location via a first hinge 140 and at a rear location via a second hinge 142. Similarly, the second frame section 106 may be pivotally coupled to the main frame 102 at a forward location via a third hinge 144 and at a rear location via a fourth hinge 146. The different hinges may allow for the different frame sections to be raised to a folded, transport configuration.

The implement 100 may be supported by a plurality of wheels. For example, a pair of front wheels 112 are coupled to the frame at a front end thereof. The main frame 102 may be further supported by a first pair of wheels 114 and a second pair of wheels 116. The first inner frame 104 may be supported by a third pair of wheels 118 and the second inner frame 106 may be supported by a fourth pair of wheels 120. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include more than the front wheels 112. For instance, there may be back wheels disposed near the rear of the implement for additional support.

In the embodiment of FIG. 1, each frame section 102, 104, 106 is capable of supporting at least two gang assemblies. The main frame 102, for example, supports a pair of front gang assemblies and a pair of rear gang assemblies. As shown, the pair of front gang assemblies may include a first main frame front gang assembly 122 and a second main frame front gang assembly 124. Likewise, the pair of rear gang assemblies may include a first main frame rear gang assembly 126 and a second main frame rear gang assembly 128. The first frame section 104 may include a front gang assembly 130 and a rear gang assembly 132, and the second frame section 106 may include a front gang assembly 134 and a rear gang assembly 136. The first and second frame sections may include a pair of front and rear gang assemblies in other embodiments.

Each gang assembly includes a plurality of work tools 138 such as discs or coulters for breaking up soil. The tools 138 are maintained mutually spaced apart relationship with one another.

In the illustrated embodiment of FIG. 1, the agricultural implement 100 may include a plurality of actuators for controlling an angle at which the gang assemblies are oriented. This angle is referred to as the gang angle. Each actuator may be a hydraulic actuator, electric actuator, or any other known actuator. Moreover, each actuator may include an outer body or cylinder in which a rod or piston moves between an extended position and a retracted position. For purposes of this disclosure, the actuators are similar in size in that the cylinder bore and stroke length are the same. To bleed air from the system, the actuators may utilize an internal rephrase cartridge to flow through the whole system.

In FIG. 1, the main frame 102 includes a first front actuator 150 for controlling the gang angle of the first main frame front gang assembly 122, a first rear actuator 152 for controlling the gang angle of the first main frame rear gang assembly 126, a second front actuator 148 for controlling the gang angle of the second main frame front gang assembly 124, and a second rear actuator 160 for controlling the gang angle of the second main frame rear gang assembly 128.

The first frame section 104 may include a front actuator 154 for controlling the gang angle of the front gang assembly 130 and a rear actuator 156 for controlling the gang angle of the rear gang assembly 132. Likewise, the second frame section 106 may include a front actuator 162 for controlling the gang angle of the front gang assembly 134 and a rear actuator 164 for controlling the gang angle of the rear gang assembly 136.

Figure 2:
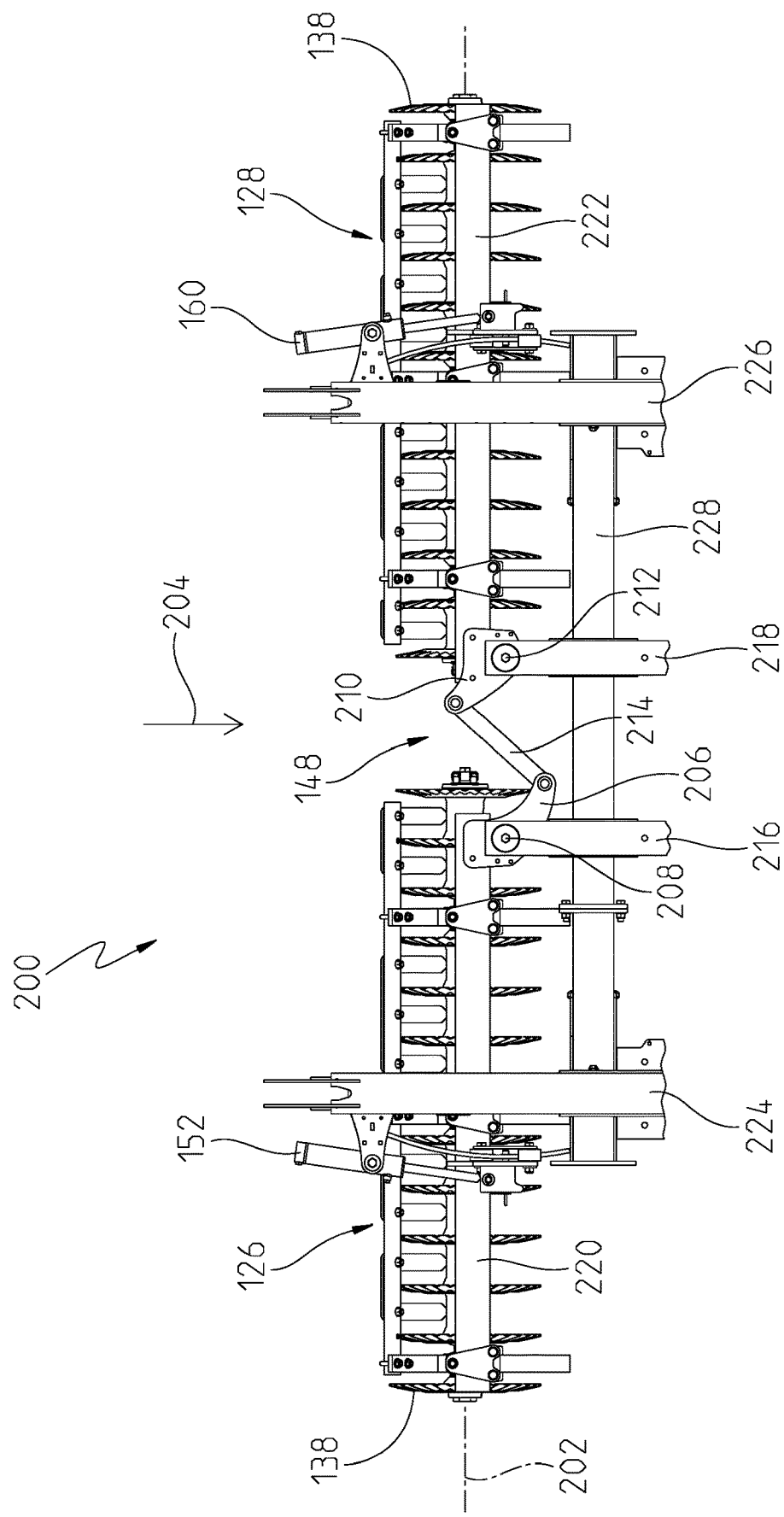
FIG. 2 is a schematic of a portion of a rear gang assembly in a first position.

As shown in FIGS. 1 and 2, the implement 100 may include a gang linkage 148 that couples the pair of rear gang assemblies 126, 128 to one another and synchronously adjusting the assemblies during angular adjustment. In other words, as the gang angle of the first main frame rear gang assembly 126 changes, the gang linkage 148 interconnects the second main frame rear gang assembly 128 thereto such that the gang angle of the second main frame rear gang assembly 128 is substantially the same as the gang angle of the first main frame rear gang assembly 126. The gang linkage essentially ensures that the side-to-side gang assemblies are maintained at approximately the same gang angle at all times.

In the illustrated embodiment, the gang linkage is shown as a mechanical linkage. It may include an interconnecting link 214 pivotally coupled to a first link 206 connected to the first main frame rear gang assembly 126 and to a second link 210 connected to the second main frame rear gang assembly 128. The first link 206 may be pivotally coupled to a first linkage beam 216 via a first pivot 208. The second link 210 may be pivotally coupled to a second linkage beam 218 via a second pivot 212.

In FIG. 2, the first main frame rear gang assembly 126 and the second main frame rear gang assembly 128 are shown disposed at a first position 200 corresponding to a zero gang angle. In this first position, both gang assemblies are aligned along a transverse axis 202 as shown. The transverse axis 202 is oriented at approximately 90° with respect to a forward travel direction (indicated by arrow 204) of the implement 100. Each gang assembly may include a gang beam to which the respective gang of work tools 138 is rotatably coupled. In FIG. 2, the first main frame rear gang assembly 126 includes a first gang beam 220, and the second main frame rear gang assembly 128 includes a second gang beam 222. In the first position 200, the first and second gang beams are disposed along the axis 202 and thus substantially transverse or perpendicular to the travel direction 204.

It is further shown in FIG. 2 that the first gang beam 220 may be coupled to a first support beam 224, and the second gang beam 222 may be coupled to a second support beam 226. The first and second support beams may extend in a direction substantially parallel to the travel direction 204, and both beams may be coupled to a transverse beam 228 as shown in FIG. 2. The overall frame structure of the main frame 102, first frame section 104, and second frame section 106 may differ from the embodiments shown in FIGS. 1 and 2, and thus the illustrated embodiments are not intended to be limited by the frame structure shown.

Figure 3:
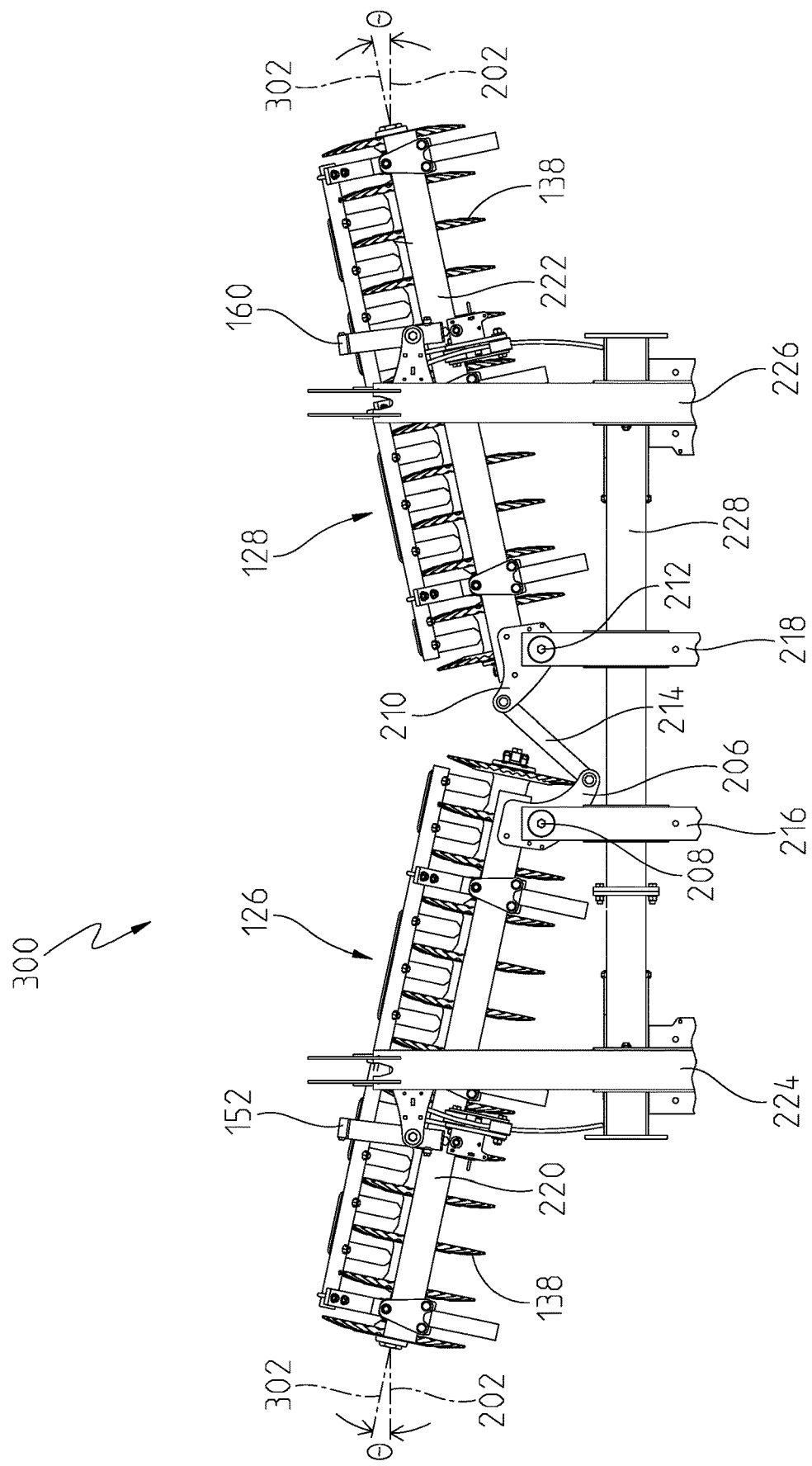
FIG. 3 is a schematic of the portion of the rear gang assembly of FIG. 2 in a second position.

With the rear gang assemblies 126, 128 of the main frame 102 being at a zero gang angle in FIG. 2, the same assemblies 126, 128 are shown at a different gang angle in FIG. 3. In particular, a second position 300 of the rear gang assemblies 126, 128 is shown in which both gangs are angled at approximately the same angle (along second axis 302) but which is greater than the zero degree gang angle of the first position 200. In another words, the gangs are horizontally adjusted relative to the frame to which they are coupled for adjusting the angle between the direction of travel 204 of the frame and the axis of rotation 302.

In one non-limiting example, the gang angle may be approximately 12° in the second position 300. In another example, the gang angle may be about 6°. These are only provided as examples, and any known or desired gang angle may be depicted in FIG. 3 such that the rear gang assemblies are shown being capable of reaching an angle different from that in FIG. 2.

In FIGS. 1-3, the gang linkage 148 is shown as a mechanical linkage interconnecting the pair of rear gang assemblies on the main frame 102. However, the gang linkage 148 may also be an electric, hydraulic, or electro-hydraulic linkage. For instance, sensors may be disposed on each gang assembly and communicate with a controller in regards to the angular position of the respective gang assembly. In turn, the controller may communicate with an electric or hydraulic system for adjusting gang angle to ensure the front and rear gang assemblies are angularly synchronized with one another. The interconnecting link 214 in FIG. 2, for example, may be an actuator operably controlled by the controller to adjust gang angle. Other conventional mechanisms and systems may be employed to control gang angle. Moreover, while only the rear gang assemblies of the main frame 102 are shown and described with respect to FIGS. 2 and 3, it is to be understood that similar linkages may be utilized with the front gang assemblies of the main frame. Further, in the event the first or second frame section includes a pair of gang assemblies, a similar gang linkage may be used to control and synchronize the gang angle between the pair of assemblies.

Although not shown, an electronic control system may be used for controlling the agricultural implement 100. The implement may be pulled by a work machine (not shown), which may include a frame or chassis supported by a plurality of ground-engaging mechanisms (not shown) such as wheels. An operator's cab (not shown) may be mounted to the frame and an operator may control the work machine and implement 100 therefrom. To do so, the work machine may include a plurality of controls (not shown) such as joysticks, levers, switches, knobs, a steering wheel, pedals, and the like. A controller (not shown) may be electrically coupled to the plurality of controls, and the controller may control the functionality of the work machine and implement 100. In one example, the operator may operably control the gang linkage 148 in order to adjust gang angle from the cab.

Moreover, a user interface (not shown) may be disposed in the operator's cab. The user interface may include a display (not shown) for displaying various characteristics of the work machine such as, but not limited to, speed, fluid temperatures, fluid pressures, direction of travel, etc. The display may be a touchscreen display that allows the operator to control certain functions of the machine and implement (e.g., gang linkage 148) by touching a button on the display. Other uses of the user interface may be available and this disclosure is not intended to be limited in any way with respect to the functionality of the operator controls or user interface.

As described above, the user interface (not shown) may also include controls for controlling the implement 100, such as movement of the first or second frame section, adjusting gang angle of one of the gang assemblies, etc.

Figure 4:
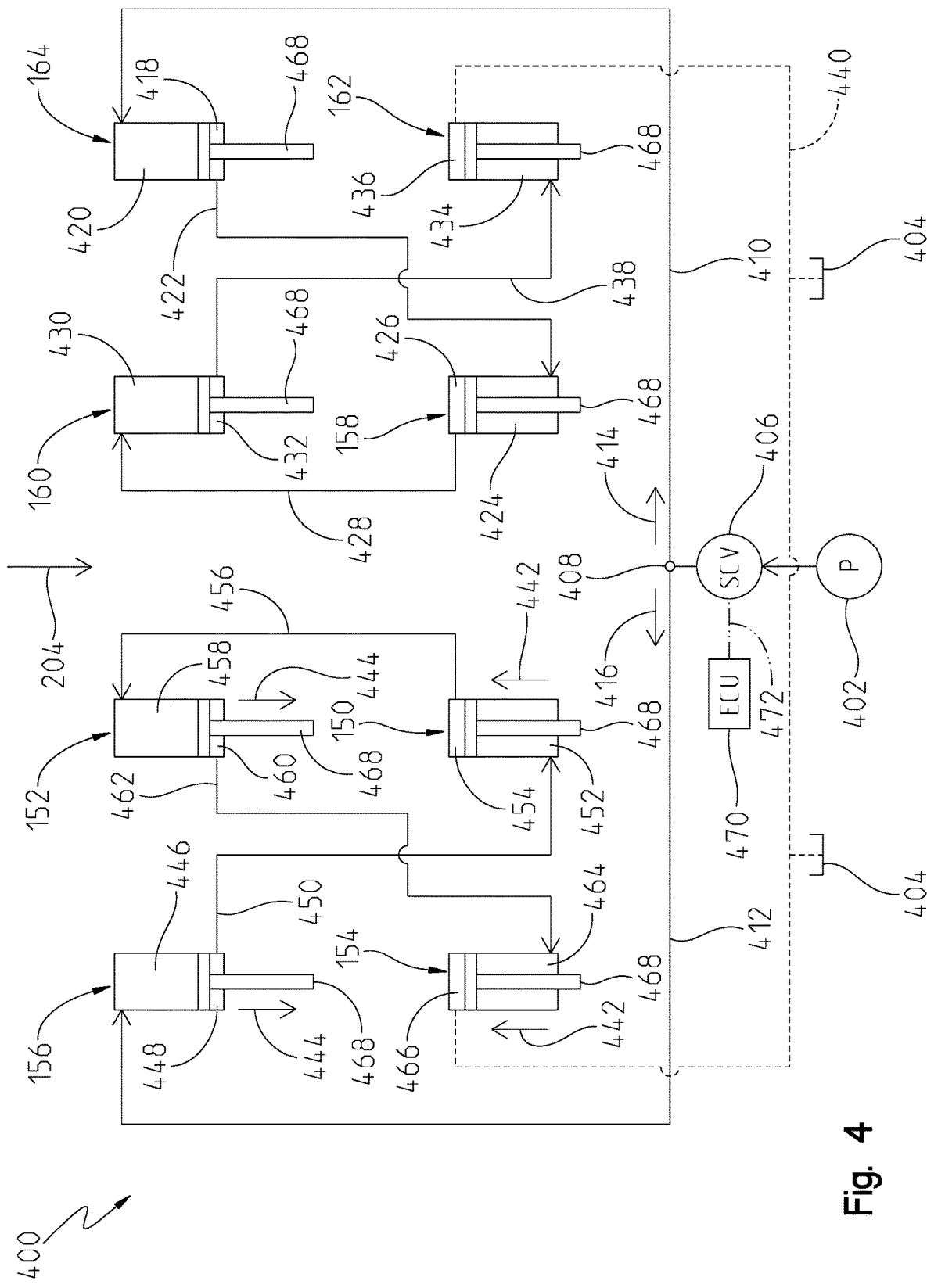
FIG. 4 is a diagram of a hydraulic control system of the work machine and agricultural implement of FIG. 1 according to a first embodiment.

Referring to FIG. 4, an embodiment of a hydraulic control system 400 for controlling the gang angle of a plurality of gang assemblies mounted to a multi-section frame of an agricultural implement 100. With multi-section frame implements such as the one shown in FIG. 1, it is desirable to adjust the gang angle on the go during field operation without the operator having to exit the cab. Moreover, a gang linkage of the implement may be used for timing the gang angle adjustment between both sides thereof. As shown in FIG. 1, the gang linkage may be located at or near the rear and center of the main frame 102, although the location may vary depending upon the implement.

To be able to achieve infinite gang angle adjustment, the system 400 includes a plurality of actuators each comprising a cylinder-piston-rod configuration. The main frame 102 includes four of the plurality of actuators, and the first and second frame sections each include a pair of actuators, as shown in FIGS. 1 and 4. In an embodiment in which there is a first outer wing coupled to the first frame section and a second outer wing coupled to the second frame section, each outer wing may include a pair of actuators for controlling a front and rear gang assembly.

In conventional hydraulic control systems, the two most common types of systems are series hydraulic control and parallel hydraulic control. A series hydraulic control is typically a pure mechanical system without any electronic control. Here, hydraulic fluid is supplied from a fluid source to a first or master actuator or cylinder. The master cylinder receives the full amount of fluid flow, and as the master cylinder is actuated, fluid is displaced from the master cylinder and flows to the next-in-line actuator or cylinder. In this system, each actuator or cylinder is fluidly connected to one another in a series which allows for each cylinder to quickly receive fluid from the fluid source.

Parallel hydraulic control can include electronic control unlike the series hydraulic control. In this type of control, valves are utilized to control how fluid flows through the system. Fluid may flow across each section in an equal amount so that fluid is available at each actuator. The fluid source, however, only has a limited amount of fluid. Thus, when an operator wants to control the flow of fluid, the parallel hydraulic control is capable of providing fluid to the actuator at a particular section but it may take much longer than in a series hydraulic control.

Referring to FIG. 4, the present disclosure provides a series hydraulic control in the form of a master-slave configuration, but the arrangement is different than conventional master-slave hydraulic systems. In conventional master-slave systems, all cylinders or actuators are operably controlled in the same direction, i.e., they each retract or extend in the same direction. Oil or other hydraulic fluid flows along a path from rod to base to rod. To achieve this, the conventional system requires the cylinder bores to decrease or step down in size along the flow path in order to maintain a consistent volume from cylinder to cylinder.

In the illustrated embodiment of FIG. 4, however, the master-slave hydraulic system is different. Here, each of the plurality of actuators in the system have the same size, i.e., the same bore and stroke length. To achieve this, the actuators do not all move in the same direction. This will be described in greater detail below.

Referring to FIG. 4, a fluid source 402 provides hydraulic fluid to the system 400. The fluid source 402 may be located on the work machine or tractor (not shown), and a hydraulic pump may supply the fluid to the implement 100. A fluid reservoir or tank 404 may also be provided for fluid to return from the implement 100. The fluid source 402 and fluid reservoir 404 may be fluidly coupled to one another.

The work machine or tractor may also include a selective control valve 406 that is fluidly coupled to the fluid source 402. The valve 406 may be any type of valve that selectively allows fluid to flow from the work machine to the implement 100. The valve 406 may be an electrohydraulic control valve that is controlled by a machine controller 470. For example, the controller 470 may be programmed to selectively open and close the control valve 406 via communication line 472. If the work machine requires additional hydraulic fluid to perform an operation, the controller 470 may close the valve 406 and not permit fluid to flow to the implement 100. In one embodiment, the selective control valve 406 may be biased to its open position and thus may be referred to as a normally open control valve. In another embodiment, the valve 406 may be biased to its closed position and thus be referred to as a normally closed valve.

In any event, hydraulic fluid may be supplied by the fluid source 402 through the control valve 406 and to the implement 100 via a flow path or pressure line to a T-connector 408. As fluid is provided from the source 402 to the T-connector, the fluid is directed into a first fluid line 410 and a second fluid 412. The first fluid line 410 directs hydraulic fluid to a left side of the implement (with respect to the travel direction 204) along a first fluid direction 414 and the second fluid line directs hydraulic fluid to a right side thereof along a second fluid direction 416. The left side includes a first half of the main frame 102 and the second frame section 106, and the right side includes a second half of the main frame 102 and the first frame section 104.

Looking at the right side of the implement 100 implement, the hydraulic fluid flows from the T-connector 408 to the first frame section rear actuator 156. In particular, an inlet is located at a base end 446 of the actuator 156, and fluid enters the base end 446 to move the actuator 156 in an extending direction 444 to an extended position, as shown in FIG. 4. As the actuator 156 extends, it forces hydraulic fluid to exit a rod end 448 of the actuator 156. The fluid exits the rod end 448 and flows via fluid line 450 to the first main frame front actuator 150. Here, the fluid enters at a rod end 452 of the actuator 150, thereby moving the actuator 150 in a retracting direction 442 to its retracted position, as shown in FIG. 4. As the actuator 150 moves to its retracted position, hydraulic fluid located at a base end 454 of the actuator 150 is forced to exit therefrom.

Fluid exiting the actuator 150 flows rearward along fluid line 456 to the first main frame rear actuator 152. Here, fluid enters a base end 458 of the actuator 152, causing the actuator 152 to move in the extending direction 444 to its extended position. As the actuator 152 extends, fluid located in a rod end 460 of the actuator 152 is forced to exit. Hydraulic fluid exiting the rod end 460 of the actuator 152 flows via fluid line 462 to the first frame section front actuator 154. The fluid enters the actuator 154 at its rod end 464, thereby forcing the piston rod 468 to move in the retracting direction 442 to its retracted position. As the actuator 154 retracts, hydraulic fluid located in a base end 466 of the actuator 154 is forced to exit the actuator via a return line 440.

The return line 440 is fluidly coupled to the reservoir 404, as shown in FIG. 4. Fluid in the return line 440 may be recirculated to either the first or second fluid lines by the pressure source 402.

Similar to the right side of the implement 100, the left side may operate in substantially the same manner. For instance, hydraulic fluid in the first fluid line 410 flows in the first direction 414 to the second frame section 106, and in particular to the second frame section rear actuator 164. The second frame section rear actuator 164, like the other three actuators on the left side of the implement and the four actuators on the right side of the implement, includes a base end 420 and a rod end 418. A piston rod 468 moves in either a retracting direction 442 or extending direction 444 based on hydraulic pressure.

As shown in FIG. 4, hydraulic fluid enters the actuator 164 at its base end 420, thereby forcing the piston rod 468 to its extended position. As the actuator 164 extends, fluid at the rod end 418 is forced to exit and flow via fluid line 422 to the second main frame front actuator 158. Here, the fluid enters the actuator 158 at its rod end 424, thereby moving the piston rod 468 in the retracting direction 442. As the actuator 158 retracts to its retracted position, hydraulic fluid in the base end 426 is forced to exit into fluid line 428 from the actuator 158.

Hydraulic fluid flow from the second main frame front actuator 158 to the second main frame rear actuator 160 via the fluid line 428. In particular, the fluid enters the base end 430 of the actuator 160, thereby forcing the piston rod 468 to move in the extend direction 444 to its extended position, as shown. As the piston rod 468 extends, hydraulic fluid in the rod end 432 of the actuator 160 is forced out of the actuator 160 and into fluid line 438 where it flows to the second frame section front actuator 162. The fluid enters the actuator 162 at its rod end 434, thereby forcing the piston rod 468 to retract to its retracted position of FIG. 4. As the piston rod 468 retracts, it causes fluid displacement in the base end 436 of the actuator such that fluid exits therefrom via the return line 440. As described above, hydraulic fluid in the return line 440 may flow to the reservoir 404 and be recirculated in the hydraulic system 400.

Although described above, it is worth noting that the extension or retraction of the actuators causes the respective gang assembly to move in such a manner that its gang angle can be adjusted. In other words, as fluid is supplied to the first frame section rear actuator 156, the piston rod 468 moves to its extended position to induce a change in gang angle of the first frame section rear gang assembly 132. Similarly, as hydraulic fluid pressurizes the first main frame rear actuator 152, the piston rod 468 moves to its extended position to vary the gang angle of the first main frame rear gang assembly 126. In the same manner, movement of the first frame section front actuator 154 varies the gang angle of the first frame section front gang assembly 130, and movement of the first main frame front actuator 150 hydraulically adjusts the gang angle of the first main frame front gang assembly 122.

The left side of the implement 100 may be controlled in the same way. The extension of the piston rod 468 in the second frame section rear actuator 164 varies the gang angle of the second frame section rear gang assembly 136, and the extension of the piston rod 468 in the second main frame rear actuator 160 operably adjusts the gang angle of the second main frame rear gang assembly 128. Likewise, retraction of the piston rod 468 in the second frame section front actuator 162 varies the gang angle of the second frame section front gang assembly 134, and retraction of the piston rod 468 in the second main frame front actuator 158 hydraulically adjusts the gang angle of the second main frame front gang assembly 124.

Moreover, the gang linkage 148 is capable of interlocking or interconnecting the rear gang assemblies 126, 128 on the main frame to maintain the gang angle of each to be approximately the same. Further, the gang angle of the front gang assemblies 122, 124 may be synchronized with one another as well. With the hydraulic cylinders being the same size and the stroke of the piston rods being the same, the gang angle of the front and rear gang assemblies on the first and second frame sections may be the same as the gang angle of each gang assembly on the main frame. Thus, the implement 100 may be hydraulically controlled in such a way that the gang angle of each gang assembly may be varied as desired but such that the gang angle of each gang assembly is substantially the same.

As described above, the master-slave configuration of the hydraulic control system 400 is such that hydraulic fluid is directed from the pressure or fluid source 402 to one of the wing frames, rather than to an actuator on the main frame. This is shown clearly in FIG. 4 where fluid flows via the first fluid line 414 to the second frame section rear actuator 164 and via the second fluid line 416 to the first frame section rear actuator 156.

Moreover, hydraulic fluid returns to the reservoir 404 via the return line 440 as it exits from one of the wing frames rather than from one of the actuators on the main frame 102. In FIG. 4, for example, fluid exits the first frame section front actuator 154 and the second frame section front actuator 162.

Another feature of the hydraulic control system 400 is the rod-to-rod and base-to-base connections. In most conventional systems, hydraulic fluid flows from a base end of a first actuator to a rod end of a second actuator, and from the rod end of the second actuator to a base end of a third actuator, and so on. Here, in the illustrated embodiment of FIG. 4, hydraulic fluid flows the rod end of one actuator to a rod end of another actuator, and from the base end of one actuator to a base end of another actuator. For example, hydraulic fluid flows via fluid line 422 from the rod end 418 of the second frame section rear actuator 164 to the rod end 424 of the second main frame front actuator 158. Likewise, hydraulic fluid flows via fluid line 450 from the rod end 448 of the first frame section rear actuator 156 to the rod end 452 of the first main frame front actuator 150. As an example of the base end to base end flow, hydraulic fluid flows via fluid line 428 from the base end 426 of the second main frame front actuator 158 to the base end 430 of the second main frame rear actuator 160. Moreover, hydraulic fluid flows via fluid line 456 from the base end 454 of the first main frame front actuator 150 to the base end 458 of the first main frame rear actuator 152.

In the embodiment of FIG. 4, the front actuators on the main frame 102, first frame section 104 and second frame section 106 are shown in their retracted positions, whereas the rear actuators on all three frames are shown in their extended positions. In conventional master-slave series circuits, all of the actuators move in the same direction, i.e., either in the retracted direction or extended direction. This is not the case with the illustrated embodiment of FIG. 4, however. Due to the actuators being of the same size, the rear actuators move in an opposite direction from their counterpart front actuators. Thus, due to the size of the actuators being the same and the gang linkage 148, the gang angle of each gang assembly on both sides of the implement 100 may be synchronized with one another and maintained at approximately the same gang angle.

In FIG. 4, the actuators on the front of the multi-section implement 100 may move to their retracted position to decrease gang angle, whereas the actuators on the rear of the implement 100 move to their extended position to decrease gang angle. When the direction of flow is reversed, the gang angle of the respective gang assemblies can be increased. For example, in one embodiment (not shown), the hydraulic fluid may flow first to the rod end 434 of the second frame section front actuator 162 to actuate it to its extended position. As the actuator 162 extends, fluid displacement at the base end 436 causes fluid to flow via line 438 to the base end 430 of the second main frame rear actuator 160 thereby causing its piston rod 468 to retract. The flow of hydraulic fluid still begins at the wing frame, rather than the main frame, but it flows in the opposite direction as described above. Thus, the same is true on the right side of the implement 100 where hydraulic fluid enters the rod end 464 of the first frame section front actuator 154 to actuate it to its extended position. As the actuator 154 extends, fluid displacement at the base end causes fluid to flow via line 462 to the base end 458 of the first main frame rear actuator 152 thereby causing its piston rod 468 to retract. This hydraulic flow continues accordingly until it exits the rod end 448 of the first frame section rear actuator 156 and the rod end 418 of the second frame section rear actuator 164. Although not shown, one or more valves may be disposed in the hydraulic control system 400 to control the direction of fluid flow therethrough 400. In the event of this reverse flow, hydraulic fluid exiting the rod ends of the first and second frame section rear actuators 156, 164 may be fluidly coupled to the reservoir 404 via fluid lines not shown in either FIG. 4 or 5. A selective control valve may be operably controlled by the controller 470, for example, to either open or close the fluid line to the reservoir 404. Other embodiments for controlling fluid flow through the system may be incorporated as well.

Figure 5:
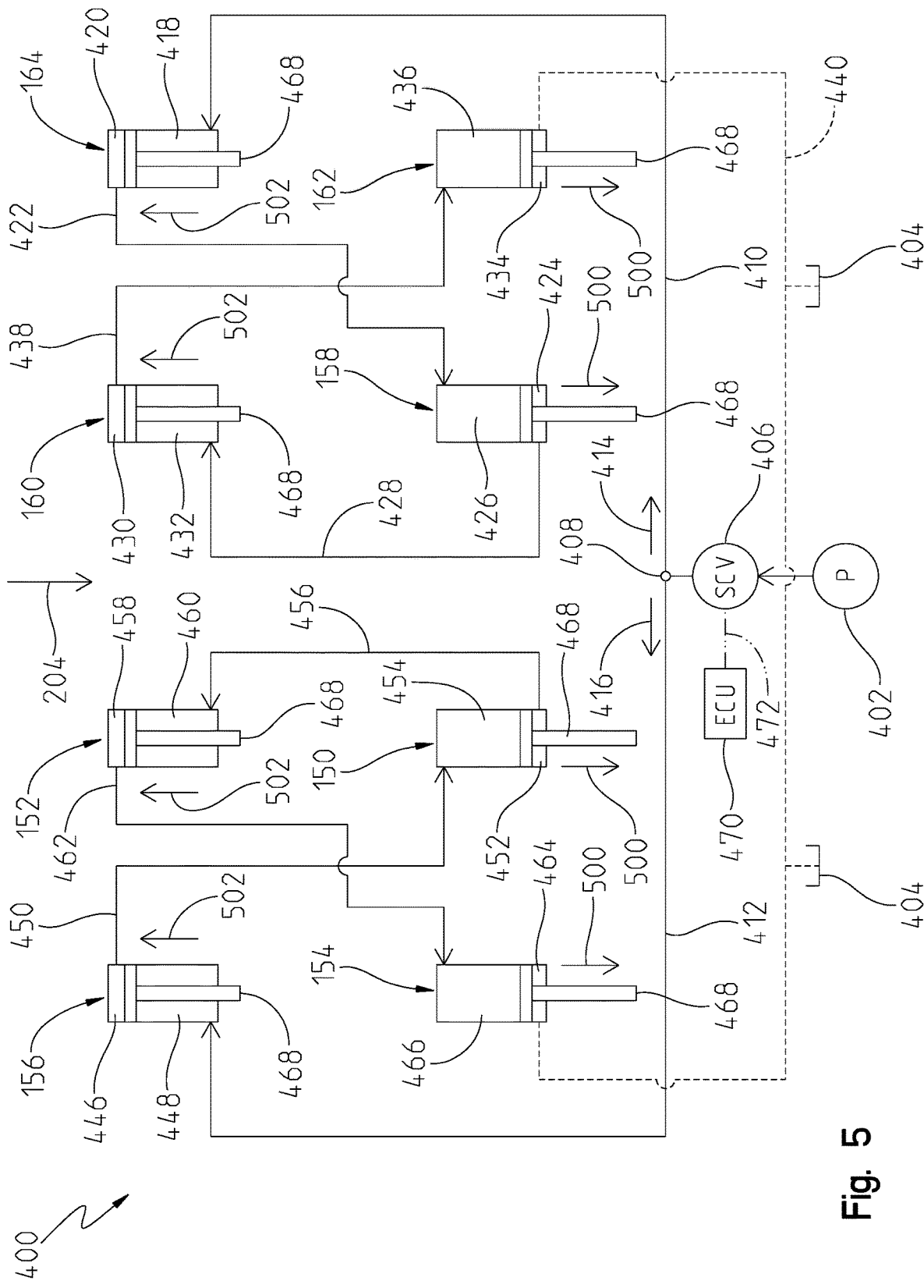
FIG. 5 is a diagram of the hydraulic control system of FIG. 4 according to a second embodiment.

In an alternative embodiment shown in FIG. 5, the gang angle of the plurality of gang assemblies is increased as the front actuators 150, 154, 158, 162 are extended and the rear actuators 152, 156, 160, 164 are retracted. Instead of reverse fluid flow, however, hydraulic fluid may be supplied by the pressure source 402 via the first and second fluid lines 414, 416 to the rod ends 418, 448 of the first and second frame section rear actuators 164, 156, respectively. In doing so, the piston rod 468 of both actuators is actuated in a retracting direction 502 to the retracted position of FIG. 5. As the actuators retract, fluid displacement induces fluid in the base end of each actuator to exit therefrom. In FIG. 5, the fluid exiting the actuator 156 flows via fluid line 450 to the base end 454 of the first main frame front actuator 150. Likewise, fluid exiting the base end 416 of the actuator 164 flows via fluid line 422 to the base end 426 of the second main frame front actuator 158. The flow of hydraulic fluid continues in the opposite direction of FIG. 4 until the fluid exits rod end 464 of the first frame section front actuator 154 and the rod end 434 of the second frame section front actuator 162 and returns to the reservoir 404. Valves and the like may be incorporated in the hydraulic control system to control the direction of fluid flow through the system. At least in the embodiments of FIGS. 4 and 5, however, the fluid is always supplied by the source 402 to the rear actuator on the first and second frame sections. Moreover, in this disclosure, embodiments are presented in which hydraulic fluid is supplied by the source 402 to an actuator located on a wing frame (e.g., first or second frame section) and not the main or center frame.

It is also worth noting that the utilization of control valves in the system 400 is possible. For example, the implement 100 may include a plurality of control valves for controlling the direction of hydraulic fluid flow through the system and thus gang angle adjustment. Each control valve may be in electrical communication with the controller 470, which is further capable of receiving commands from the operator controls in the cab to control the implement. Each control valve may therefore be an electrohydraulic control valve that is capable of moving between an open position and a closed position. Each valve may include a solenoid (not shown) that is energized by an electrical current or signal sent by the controller 470 to induce movement of the valve between the open and closed positions. The movement of the control valves can adjust fluid flow to the different actuators for controlling movement thereof and vary gang angle as desired.

As noted above, it is possible the agricultural implement may include additional frame sections besides the three shown in FIG. 1. For example, in FIGS. 6 and 7, an agricultural implement 700 may include a center or main frame section 102, one inner wing or first frame section 104, another inner wing or second frame section 106, one outer wing or third frame section 600, and another outer wing or fourth frame section 602. Each frame section may be pivotally coupled to the frame section adjacent thereto. Thus, the first frame section 104 may be pivotally coupled between the main frame section 102 and the third frame section 600, whereas the second frame section 106 may be pivotally coupled between the main frame section 102 and the fourth frame section 602. In FIG. 7, the first frame section 104 is pivotally coupled to the third frame section 600 via pivots 714, and the second frame section 106 is pivotally coupled to the fourth frame section 602 via pivots 716.

The third frame section 600 may be supported on the ground by wheel 112 and support wheels 710. The fourth frame section 602 may be supported on the ground by wheel 112 and supports 712.

As also shown in FIG. 7, the third and fourth frame sections 600, 602 may each include a front and a rear gang assembly. The third frame section 600 may include a front gang assembly 702 and a rear gang assembly 704, whereas the fourth frame section 602 may include a front gang assembly 706 and a rear gang assembly 708. These gang assemblies may be hydraulically adjusted by a hydraulic actuator to achieve a desired gang angle, as illustrated in the hydraulic control system 606 of FIG. 6. Here, for example, the front gang assembly 702 on the third frame section 600 may be hydraulically controlled by a front hydraulic actuator 608 including a piston rod 468 capable of moving between an extended position and a retracted position. As shown, the actuator 608 includes a base end 618 and a rod end 616 in which fluid acts against the piston rod 468. As fluid fills the base end 618 of the actuator 608, the piston rod 468 may be moved in an extend direction 660, whereas as fluid fills the rod end 616 the piston rod 468 may move in a retract direction 658.

Figure 6:
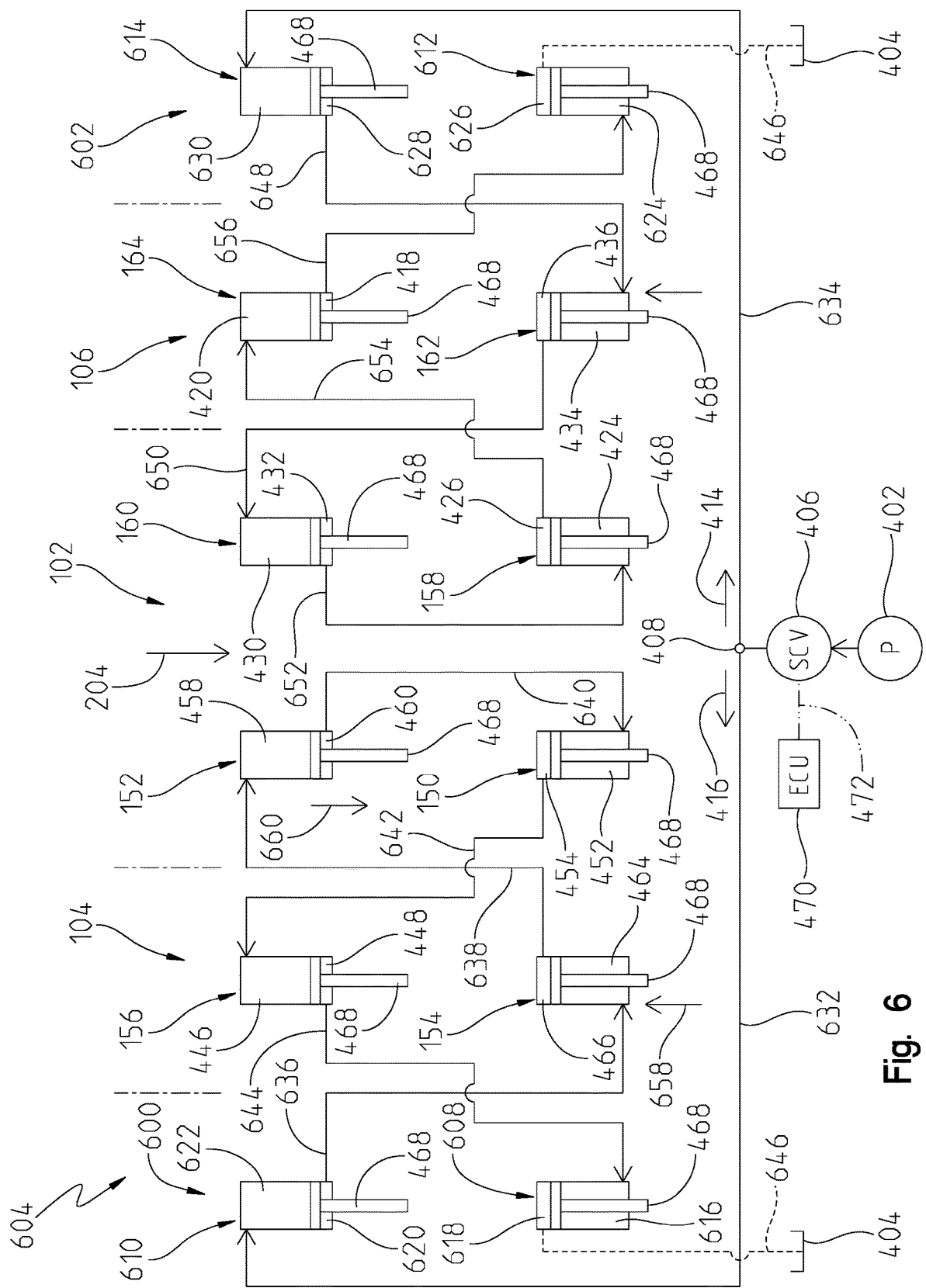
FIG. 6 is a diagram of another hydraulic control system of an agricultural implement having at least five frame sections.
Figure 7:
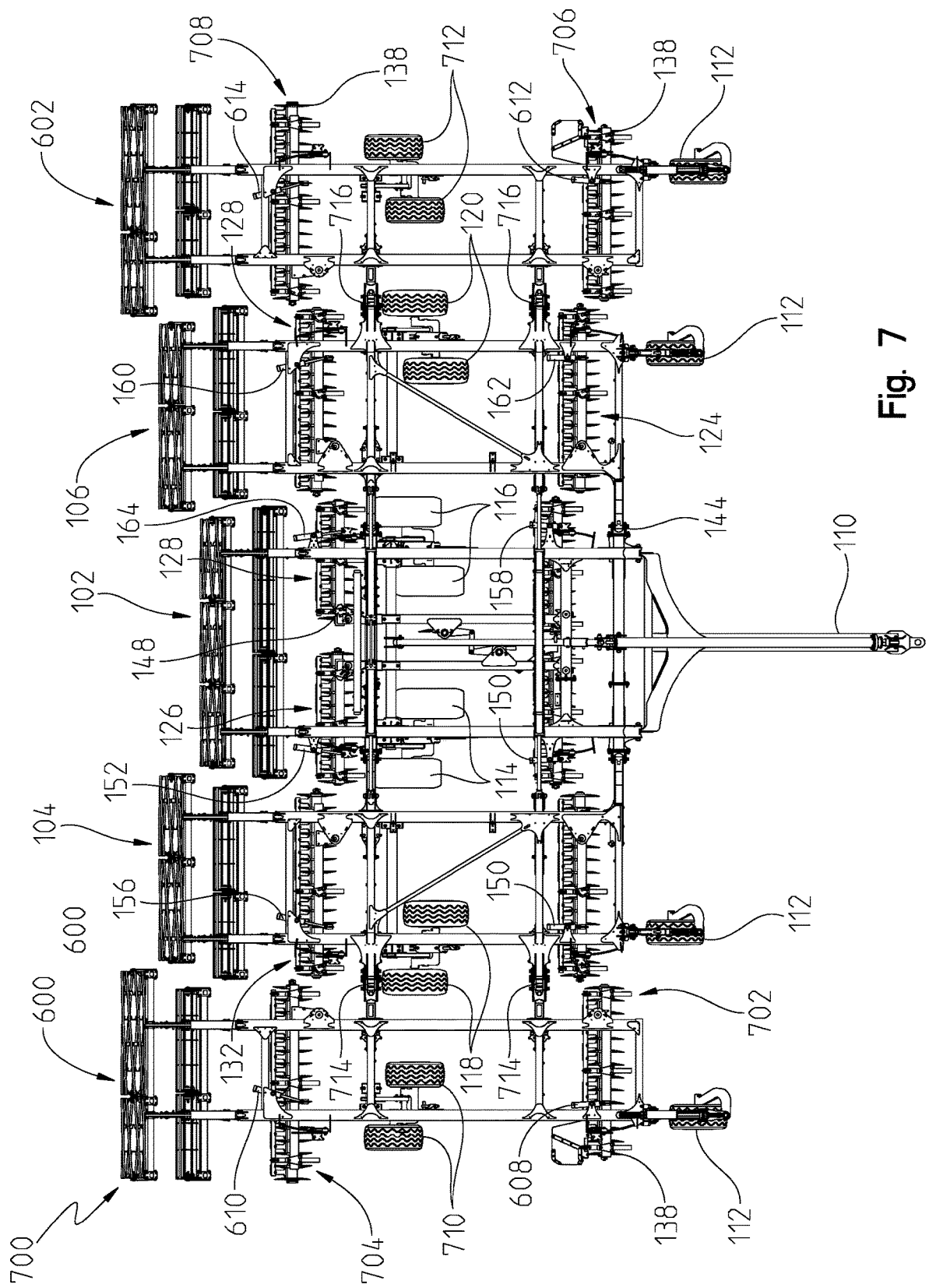
FIG. 7 is a view of a multi-section agricultural implement.

A rear gang assembly 704 on the third frame section 600 may be hydraulically controlled by a rear hydraulic actuator 610 as shown in FIG. 6. Here, the hydraulic actuator 610 includes a piston rod 468 that is movable between an extended and retracted positions. The actuator 610 comprises a rod end 620 and a base end 622, whereas fluid fills the rod end 620 the piston rod 468 moves in the retract direction 658. On the other hand, as fluid fills the base end 622, the piston rod 468 moves in the extend direction 660. In FIG. 6, and as will be described below, the third frame section rear actuator 610 acts as a master actuator over the main frame front and rear actuators 150, 152, the first frame front and rear actuators 154, 156, and the third frame front actuator 608. Thus, the fluid path of hydraulic fluid begins at the outermost wing and then weaves or criss-crosses from rear actuator to front actuator and so forth until it reaches the third frame section front actuator 608 where the fluid returns to a reservoir 404 via a return line 646.

With respect to the fourth frame section 602, a gang angle of its front gang assembly 706 may be adjusted by a front hydraulic actuator 612. Similarly, its rear gang assembly 708 may be adjusted by a rear hydraulic actuator 614. The front hydraulic actuator 612 and rear hydraulic actuator 614 each include a piston rod 468 that extends and retracts. With respect to the front actuator 612, it includes a rod end 624 and a base end 626. Likewise, the rear actuator 614 includes a rod end 628 and a base end 630.

The rear actuator 614 of the fourth frame section 602 may act as a master actuator over the main frame front and rear actuators 158, 160, the second frame front and rear actuators 162, 164, and the fourth frame front actuator 612. Thus, the fluid path of hydraulic fluid begins at the outermost wing (i.e., the fourth frame section rear actuator 614) and then weaves or criss-crosses from rear actuator to front actuator and so forth until it reaches the fourth frame section front actuator 612 where the fluid returns to the reservoir 404 via the return line 646.

To better understand this hydraulic control system 606 and the flow of hydraulic fluid therethrough, the supply of fluid and control thereof is similar to that of FIGS. 4 and 5. A hydraulic source such as a pump 402 may supply fluid stored otherwise in a reservoir 404 and deliver the fluid to a T-connector 408. A control valve 406 may be disposed between the pump 402 and T-connector 408, and an electronic control unit 470 may operably communicate via a communication link 472 with the valve 406 to selectively open or close it. As fluid flows to the T-connector 408, it may flow in either a first direction 414 towards the fourth frame section 602 or in a second direction 416 towards the third frame section 600. When the fluid flows in the first direction 414, it does so through a first fluid path 634, and as fluid flows in the second direction 416 it does so through a second fluid path 632.

As hydraulic fluid flows in the second fluid path 632, it flows to the third frame section rear actuator 610 and fills the base end 622 thereof. As it does, the rear actuator extends in an extending direction 660 to its extended position, as shown. Fluid in the rod end 620 of the actuator 610 is forced out and into a third flow path 636 which connects with the rod end 464 of the first frame section front actuator 154. As it does, the piston rod 468 of the front actuator 154 retracts to the retracted position and thereby forces fluid in the base end 466 to flow into a fourth flow path 638 which connects with the base end 458 of the main frame first rear actuator 152. Fluid in the base end 458 urges the piston rod 468 to move in the extending direction 660 thereby forcing fluid in the rod end 460 to flow via a fifth flow path 640 to the rod end 452 of the main frame first front actuator 150.

As fluid enters the rod end 452 of the front actuator 150, it forces the piston rod 468 to retract thereby forcing fluid in the base end 454 thereof to flow via a sixth flow path 642 to the base end 446 of the first frame section rear actuator 156. As it does, the piston rod 468 in the rear actuator 156 is forced to move in the extending direction 660 towards its extended position. Fluid in the rod end 448 of the rear actuator 156 exits and flows via a seventh flow path 644 to the rod end 616 of the third frame section front actuator 608. Fluid fills the rod end 616 and urges the piston rod 468 to retract towards its retracted position. As it does, fluid in the base end 618 flows out of the actuator 608 and returns to the reservoir 404 via the return line 646.

It is noted from the above description that the hydraulic control system 600 provides a fluid circuit that fluidly couples the actuators in series in a master-slave arrangement. Moreover, in the fluid circuit, a rod end of one actuator is directly fluidly coupled to a rod end of another actuator, and a base end of an actuator is directly fluid coupled to a base end of a different actuator. For example, in FIG. 6, the rod end 620 of the third frame section rear actuator 610 is directly fluidly coupled to the rod end 464 of the first frame section front actuator 154 via fluid path 636. The base end 466 of the first frame section front actuator 154 is directly fluidly coupled to the base end 458 of the main frame first rear actuator 152 via flow path 638.

As also shown, the fluid circuit weaves forward-to-backward-to-forward. In other words, the flow paths criss-cross as the third flow path 636 connects the rear actuator 610 of the third frame section 600 with the front actuator 154 of the first frame section 104, and the fourth flow path 638 connects the front actuator 154 of the first frame section 104 with the rear actuator 152 of the main frame 102.

The same is true on the other side of the implement. Hydraulic fluid supplied by the pump or fluid source 402 flows via the first flow path 634 to the base end 630 of the rear actuator 614 of the fourth frame section 602. As it does, fluid fills the base end 630 and urges the piston rod 468 to move in the extending direction 660 towards its extended position. Fluid in the rod end 628 exits the actuator and flows via an eighth flow path 648 to the base end 434 of the second frame section front actuator 162. The piston rod 468 in the front actuator 162 moves in the retracting direction 658 thereby forcing fluid to exit from the base end 436 and flow via a ninth flow path 650 to the base end 430 of the main frame second rear actuator 160.

As the fluid enters the base end 430, the piston rod 468 moves in the extending direction 660 towards the extended position and forces fluid in the rod end 432 to exit. The fluid exits and flows via a tenth flow path 652 to the rod end 424 of the main frame second front actuator 158. Fluid entering the rod end 424 may urge the piston rod 468 to move in the retracting direction 658 towards the retracted position, and force fluid in the base end 426 to flow via an eleventh flow path 654 to the base end 420 of the second frame section rear actuator 164. As fluid fills the base end 420, the piston rod 468 in the rear actuator 164 moves in the extending direction 660 and thereby forces fluid in the rod end 418 to exit and flow via a twelfth flow path 656 to the rod end 624 of the fourth frame section front actuator 612. As it does so, fluid in the base end 626 of the actuator 612 exits therefrom and returns to the reservoir 404 via the return line 646.

It is noted that the hydraulic circuit just described is also a series circuit configured in a master-slave arrangement. Unlike conventional hydraulic systems, the master actuator is on the outer-most wing of the implement, and fluid returns to the reservoir from an actuator on the outer-most wing. In FIG. 6, for example, the fluid circuit begins at the rear actuators 610, 614 of the third and fourth frame sections, respectively, and the circuit ends at the front actuators 608, 612 of the same frame sections.

As also shown in FIG. 6, the rear actuators are shown in their extended positions at the same time as the front actuators are shown in their retracted positions. Movement between the extended and retracted positions allows for an infinitely adjustable gang angle of each gang assembly. Moreover, each actuator or cylinder is the same size and stroke for a given machine. Thus, unlike most conventional master-slave arrangements which require different sized cylinders, the present disclosure provides a hydraulic system in which each actuator is sized the same. Further, as the actuators in the front extend and the actuators in the rear retract, the gang angle of each gang assembly may increase, whereas the gang angle decreases when the actuators in the front retract and the actuators in the rear extend.

Lastly, the left and right sides of the implement are timed by a gang linkage 148 as described above. The linkage 148 may be controlled mechanically, hydraulically, or any other known way. Based on the geometry of the hydraulic control system and the gang linkage 148, the two halves of the implement are synchronously timed and thereby allow for infinite gang adjustment in the operating range during operation.

While the actuators shown and described in the aforementioned embodiments are hydraulic actuators, actuators may be controlled mechanically, electrically, pneumatically, etc. For instance, in FIG. 11, one embodiment is illustrated of a control system 1100 for controlling electric linear actuators instead of hydraulic actuators. In this embodiment, each hydraulic actuator may be replaced with a linear actuator. In FIG. 4, for example, the main or center frame section may include linear actuators 150 and 158 on the front portion and linear actuators 152 and 160 on the rear portion thereof. Similarly, the first frame section 104 may include a front linear actuator 154 and a rear linear actuator 156, and the second frame section 106 may include a front linear actuator 162 and a rear linear actuator 164. Each of these linear actuators may be controlled electrically and independently by a controller 1110 in order to control the gang angle of the one or more gang assemblies on the implement.

Figure 11:
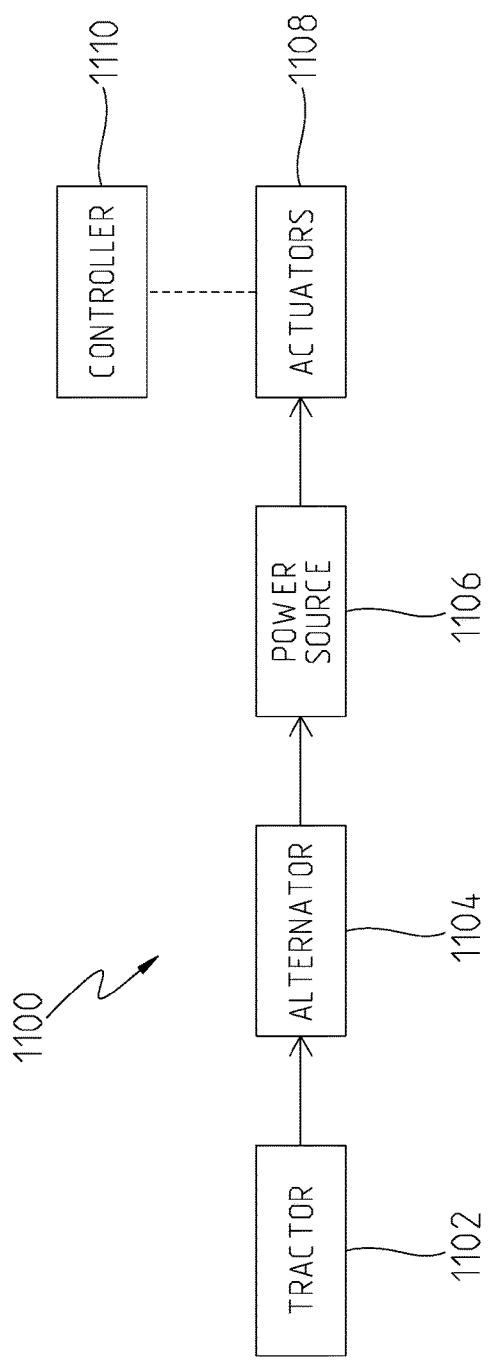
FIG. 11 is a schematic of a control system for electrically controlling actuators of an agricultural implement.

In FIG. 11, a tractor 1102 may be used to propel the agricultural implement across a field. The tractor 1102 may include an engine or other power-generating device used for providing power to a conventional alternator 1104. The alternator 1104 may in turn charge a battery or other power source 1106. The battery or other power source 1106 may be located on the tractor 1102 in one example. In an alternative example, the battery or power source 1106 may be located on the implement. In either case, the battery or power source 1106 may supply electrical power to the one or more actuators 1108 coupled to the agricultural implement.

Figure 12:
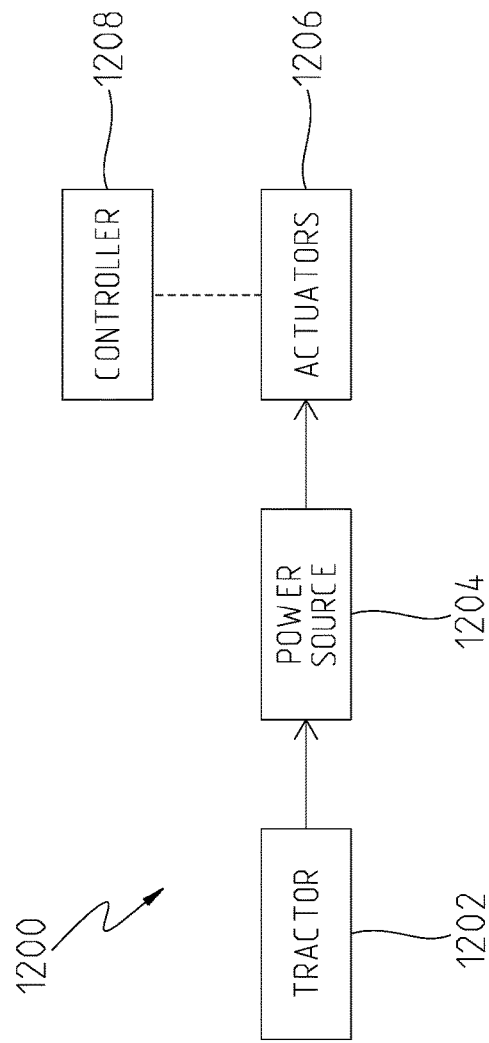
FIG. 12 is a schematic of another control system for electrically controlling actuators of an agricultural implement.

In FIG. 12, a different embodiment is illustrated of a control system 1200 for controlling electric linear actuators to control gang angle of one or more disc gangs mounted to the implement. In this embodiment, one or more electric linear actuators may be controlled by a controller 1208. Similar to the embodiment illustrated in FIG. 11, the control system 1200 may include a tractor 1202 for propelling the implement across the field. An engine or other prime mover on the tractor may directly supply power to charge a battery or other power source 1204. Here, the battery or power source 1204 may be coupled directly to the implement. Alternatively, the battery or power source 1204 may be coupled to the tractor 1202. In either case, the one or more linear actuators 1206 may draw electrical power from the battery or power source 1204.

In each embodiment shown in FIGS. 11 and 12, each electric linear actuator may be independently controlled relative to the other actuators to control gang angle of the different disc gangs mounted to the implement. In one example, John Deere's TruSet™ technology may be programmed into the controller for controlling the linear actuators to achieve desirable gang angles. The controller may be located on the tractor or the implement. In the case the controller is located on the implement, a controller on the tractor may be used to communicate instructions to the controller on the implement. In this latter case, the controller on the tractor may include the logic for controlling the controller located on the implement.

Figure 8:
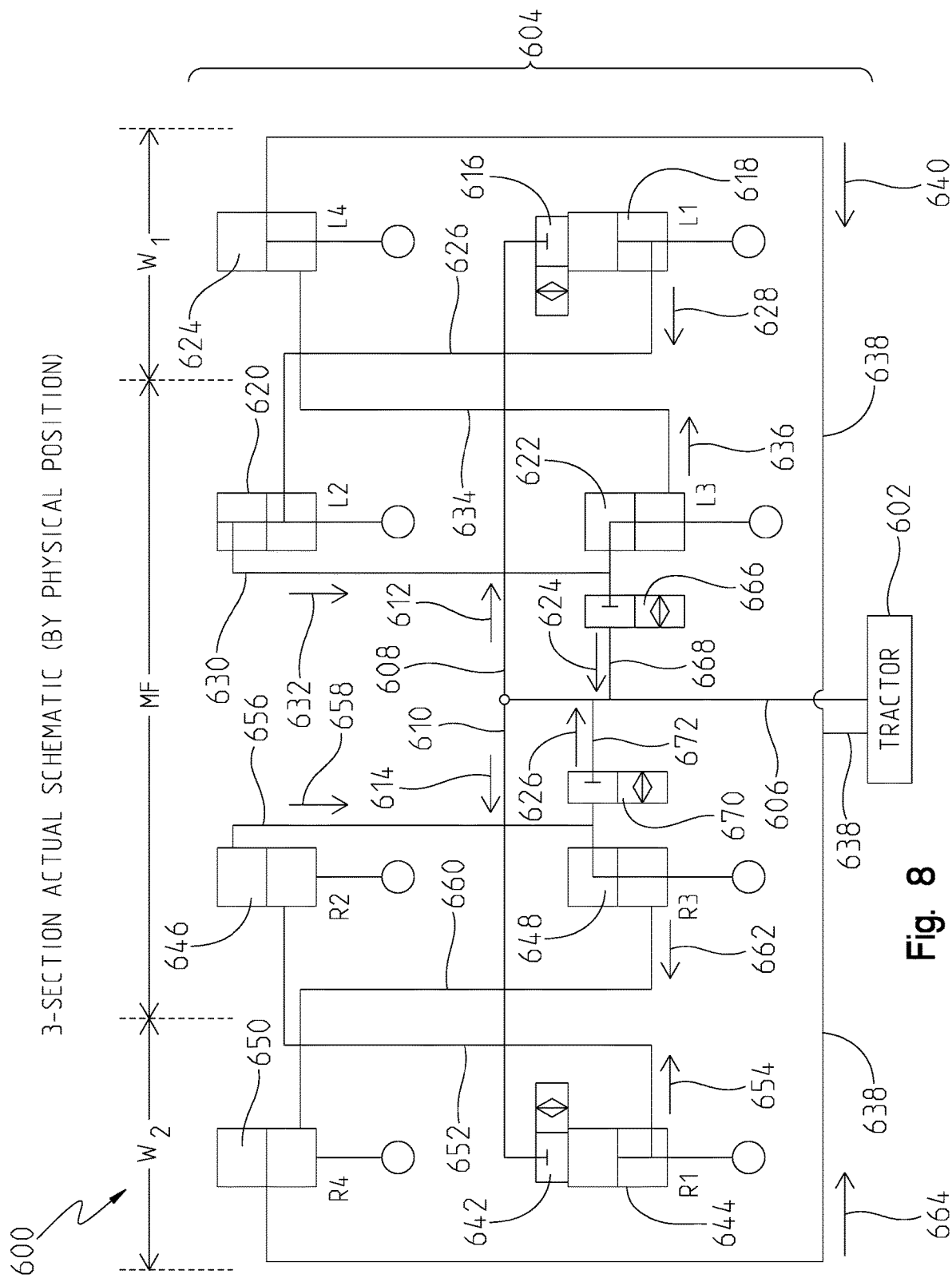
FIG. 8 is a diagram of a hydraulic control system of a work machine and agricultural implement.
Figure 9:
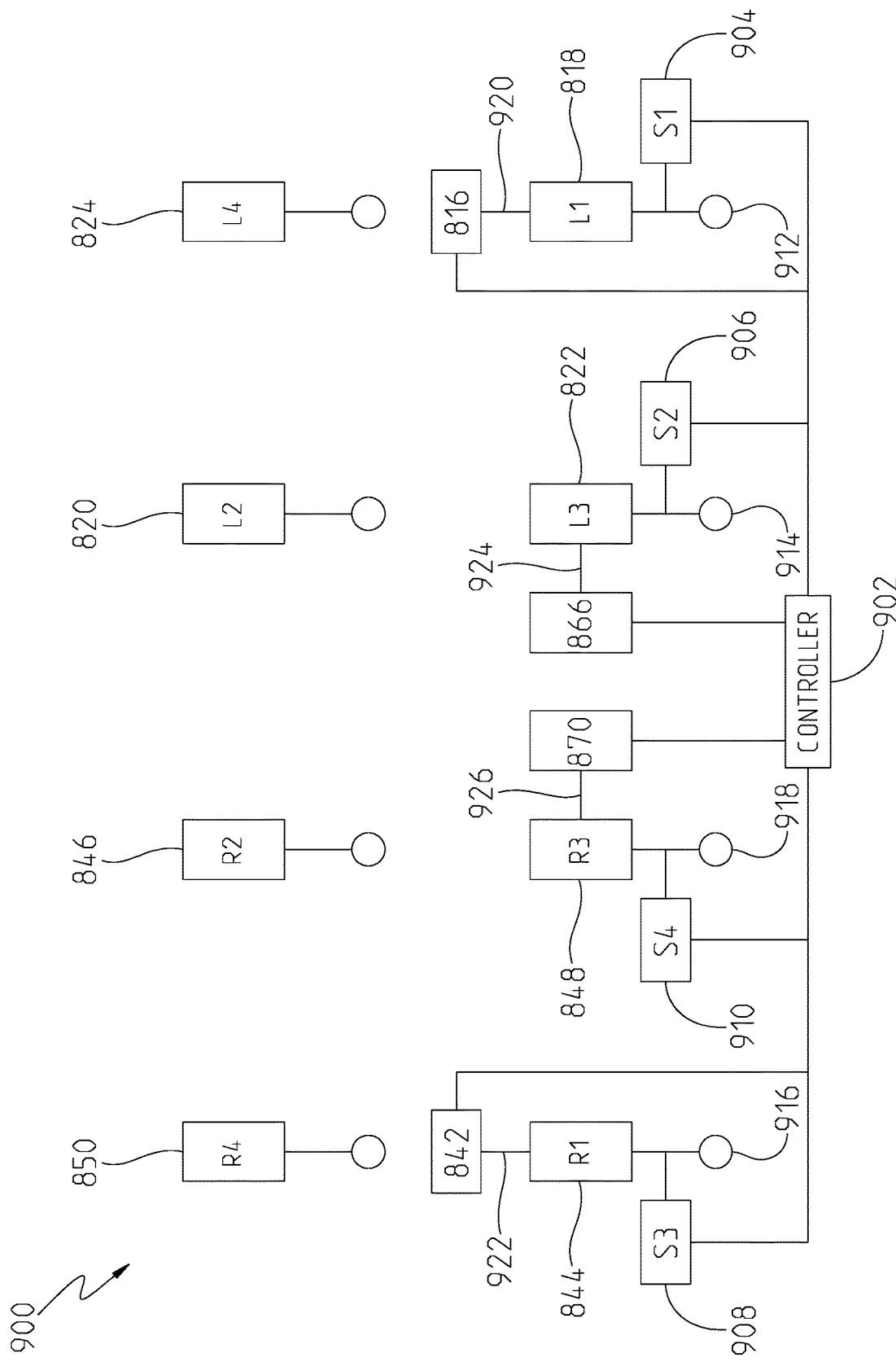
FIG. 9 is a diagram of a control circuit for controlling the hydraulic control system of FIG. 7.

In a further embodiment of the present disclosure, it is noted that the synchronizer assembly or gang linkage 148 may be replaced by a different synchronizing system. In FIG. 8, for example, the gang linkage 148 is removed. In other words, the left and right halves of the center or main frame may be synchronized or timed by a means other than a mechanical linkage. In FIGS. 8 and 9, for example, a hydraulic control system 800 and control circuit 900 may use a plurality of position sensors and control logic (e.g., John Deere's TruSet™ technology) to ensure the two halves are synchronized with one another. The position sensors may be coupled at various locations on the agricultural implement and detect the relative position of a disc gang or its gang angle and communicate the same back to a controller 902. The position sensors may each be a rotary potentiometer.

Referring to FIG. 8, the hydraulic control system 800 is shown having a supply line 806 coupled between a tractor 802 and the agricultural implement 804. Likewise, a return line 838 is further coupled between the tractor 802 and the implement 804. The implement 804 may be a multi-section agricultural implement including a plurality of disc gang assemblies such as the one depicted in FIG. 1. Moreover, the implement 804 may include a main or center frame "MF," a first frame or wing frame section "W1," and a second frame or wing frame "W2."

The main or center frame may include a first front hydraulic actuator 822, a second front hydraulic actuator 848, a first rear hydraulic actuator 820, and a second rear hydraulic actuator 846. Each hydraulic actuator may operably control a gang angle of a respective disc gang assembly mounted to the main or center frame.

The first frame section may include a first frame front actuator 818 and a first frame rear actuator 824. Likewise, the second frame section may include a second frame front actuator 844 and a second frame rear actuator 850. Each of the actuators on the first and second frames may operably control a disc gang assembly mounted thereto. Moreover, the hydraulic actuators on the main or center frame, the first frame, and the second frame may be fluidly coupled to the supply and return lines, and to a fluid supply located on either the tractor 802 or the implement 804.

The hydraulic arrangement of FIG. 8 is similar to the previous embodiments in which each half of the implement is controlled by a master-slave arrangement. For instance, a first master control valve 816 is disposed between the supply and the first frame front actuator 818. The first master control valve 816 may be controllably actuated between at least two positions, wherein at least one position blocks fluid from being received by the actuator 818, and a second of the at least two positions in which the valve 816 allows fluid to be received by the actuator 818. The master control valve 816 may be controllably actuated between a plurality of positions to control an amount of hydraulic fluid or pressure is received by the first frame front actuator 818. Moreover, in this arrangement, the first frame front actuator 818 may serve as a master over the first frame rear actuator 824, the main frame first front actuator 822 and the main frame first rear actuator 820.

The other half of the implement may be operably controlled via a second master control valve 842. The second master control valve 842 may be located between the supply of hydraulic fluid and the second frame front hydraulic actuator 844. The second master control valve 842 may be controllably actuated between at least two positions, wherein at least one position blocks fluid from being received by the actuator 844, and a second of the at least two positions in which the valve 842 allows fluid to be received by the actuator 844. The master control valve 842 may be controllably actuated between a plurality of positions to control an amount of hydraulic fluid or pressure is received by the second frame front actuator 844. The second frame front actuator 844 may serve as a master actuator over the second frame rear actuator 850, the main frame second front actuator 848, and the main frame second rear actuator 846.

The flow of hydraulic fluid through the hydraulic control system 800 will now be described. First, hydraulic fluid may be supplied from a hydraulic supply located on either the tractor 802 or the implement 804. In either case, the fluid may be supplied via the supply line 806 to a first supply line 808 and a second supply line 810. The first and second supply lines may fluidly couple to the supply line 806 via a junction, as shown in FIG. 8. Hydraulic fluid may flow through the first supply line 808 along a first flow direction 812 to the first master control valve 816, and hydraulic fluid may flow through the second supply line 810 along a second flow direction 814 to the second master control valve 842.

With the first master control valve 816 being open, fluid may flow to the first frame front actuator 818, and particularly, to a base end of the actuator 818. As it does, a rod in the first frame front actuator 818 may extend to adjust a gang angle of a corresponding disc gang assembly on the front of the first frame section. Fluid may exit from the first frame front actuator 818 and flow through a hydraulic line 826 along a third flow direction 828 to the main frame first rear actuator 820. Here, the fluid may enter the rod end of the actuator 820. Fluid exiting the main frame first rear actuator 820 may flow via fluid line 830 along flow direction 832 to the main frame first front actuator 822. Here, fluid may enter at the base end of the actuator 822, and exit from the rod end. Fluid exiting the actuator 822 may flow via fluid line 834 along flow direction 836 to the first frame rear actuator 824. Fluid may enter at the rod end of the actuator 824, and exit via the base end. Any hydraulic fluid that exits the first frame rear actuator 824 may flow along flow direction 840 via the return line 838 and return to the fluid supply.

Hydraulic fluid flowing in the second supply line 810 may be received by the second frame front actuator 844 when the second master control valve 842 is open. In particular, fluid may enter the base end of the actuator 844 and exit from the rod end. As it does, fluid may flow along flow direction 854 via fluid line 852 to the main frame second rear actuator 846. Fluid may enter the rod end of the actuator 846 and exit from the base end. Fluid may continue to flow along flow direction 858 to the main frame second front actuator 848 via fluid line 856. Fluid may enter the base end of the actuator 848 and exit from the rod end thereof. As the fluid exits the main frame second front actuator 848, it flows via line 860 along flow direction 862 to the second frame rear actuator 850. The fluid may enter the rod end of the actuator 850 and exit from the base end thereof. Hydraulic fluid exiting the second frame rear actuator 850 may flow along direction 864 via the return line 838.

In the embodiment of FIG. 8, the actuators on each side are in series with one another with the outer wing or frame section having the master actuator (e.g., the first frame front actuator 818 and the second frame front actuator 844). The return actuator may also be located on the outermost wing or frame section (e.g., the first frame rear actuator 824 and the second frame rear actuator 820).

In FIG. 8, the hydraulic control system 800 may also include a correction valve (e.g., poppet valve) on each side. For example, a first correction valve 866 and a second correction valve 870 may be provided on each side. A corresponding correction line may be fluidly coupled between the supply line 806 and the respective correction valve. For example, a first correction line 868 fluidly couples the supply line 806 to the first correction valve 866, and a second correction line 872 fluidly couples the supply line 806 to the second correction valve 870.

During operation, a correction in the fluid pressure in the hydraulic series on each side may be needed. Occasionally, there may be some drift in the hydraulic flow due to line losses and cylinder leakage. Thus, to account for this drift, each correction valve is located approximately midway along the flow path between the supply line 806 and return line 638 on each side. For instance, the first correction valve 866 is in fluid communication with the fluid line 830 between the main frame first front actuator 822 and the main frame first rear actuator 820, and the second correction valve 870 is in fluid communication with the fluid line 856 between the main frame second front actuator 848 and the main frame second rear actuator 846. The respective correction valve may be operably opened to allow fluid to exhaust from either fluid line through the valve and to the respective correction line. For example, when the first correction valve 866 is open, fluid may exhaust from fluid line 830 into the first correction line 868 and exhaust in a flow direction 874 back to the supply line 806. Similarly, when the second correction valve 870 is open, fluid may exhaust from fluid line 856 into the second correction line 872 and exhaust in a flow direction 876 back to the supply line 806. As a result, excess oil is exhausted from the hydraulic series on either side of the implement 804 to adjust for any drift.

Referring now to FIG. 9, a control circuit or system 900 is depicted for controlling the gang angle of the various disc gang assemblies mounted to the main frame, first frame section and second frame section of FIG. 8. In particular, a controller 902 may include a memory unit for storing control logic for controlling the gang angle. Moreover, the controller 902 may include a processing unit for executing the control logic. The controller 902 may be capable of communicating over a wireless network to another controller on the tractor 802 or implement 804. Alternatively, the controller 902 may be able to transmit to or receive communications from a remote location.

In this embodiment, a plurality of a position sensors may be disposed at different locations on the implement 804. Each of the plurality of sensors may be disposed in communication with the controller 902 and send position signals and the like to the controller 902. In response to these signals, the controller 902 may detect a position of the different frame sections and synchronize the sections with one another. The position sensors in effect replace the gang linkage 148 and allow the controller 902 to automatically control the synchronization absent a mechanical linkage.

As shown in FIG. 9, the plurality of position sensors may include a first position sensor 904, a second position sensor 906, a third position sensor 908, and a fourth position sensor 910. The first position sensor 904 may be coupled to a cylinder rod 912 of the first frame front actuator 818. The second position sensor 906 may be coupled to a cylinder rod 914 of the main frame first front actuator 822. The third position sensor 908 may be coupled to a cylinder rod 916 of the second frame front actuator 844, and the fourth position sensor 910 may be coupled to a cylinder rod 918 of the main frame second front actuator 848.

The controller 902 may be in communication with the first master control valve 816 and the second master control valve 842, as shown in FIG. 9. The controller 902 may operably actuate both control valves independently of one another in order to control the gang angle of the disc gang assemblies on the implement 804. As the first master control valve 816 is actuated to an open position, hydraulic fluid is able to flow through the master control valve 816 and to the first frame front actuator 818 via fluid line 920. Similarly, as the second master control valve 842 is actuated to an open position, hydraulic fluid is able to flow through the valve 842 and to the second frame front actuator 844 via fluid line 922.

The controller 902 may also be in communication with the first correction valve 866 and the second correction valve 870 in order to exhaust hydraulic fluid to correct for any drift in either series circuit. Here, when the first correction valve 866 is actuated to an open position, hydraulic fluid may exhaust via exhaust line 924 through the first correction valve 866. Similarly, when the second correction valve 870 is actuated to an open position, hydraulic fluid may exhaust via exhaust line 926 through the second correction valve 870.

As described above and shown in FIG. 9, the plurality of position sensors may be coupled to each side of the implement 804 and communicate position signals to the controller 902. In turn, the controller 902 is able to synchronize the left and right sides of the implement 804 based on these position signals. The implement of FIGS. 8 and 9 includes only the main or center frame, a first wing frame and a second wing frame. As such, it is noted that position sensors are not located on each gang assembly, but only on approximately half of the gang assemblies. In other embodiments, there may be additional position sensors located on the other gang assemblies.

The controller 902 may include a control logic such as John Deere's TruSet™ technology for determining when an adjustment to the implement is needed. During operation, the plurality of position sensors may detect a position of the frame and communicate the position to the controller 902. If the implement is not synchronized properly according to the control logic, the fluid supply (e.g., on the tractor) may provide hydraulic fluid to the corresponding fluid line and the controller 902 may operably open the first or second master control valve to allow fluid flow to either side of the implement until the implement halves are synchronized.

In one example, the master control valves may be normally-closed valves. The controller 902 may operably open either or both valves independently of each other. Thus, if fluid is provided to the first master control valve 816, the controller 902 may operably actuate the first master control valve 816 to an open position while maintaining the second master control valve 842 in its normally closed position.

Other types of valves and conditions are possible. For example, it may be possible to utilize a normally-open control valve. Other known valves may be used as well.

Figure 10:
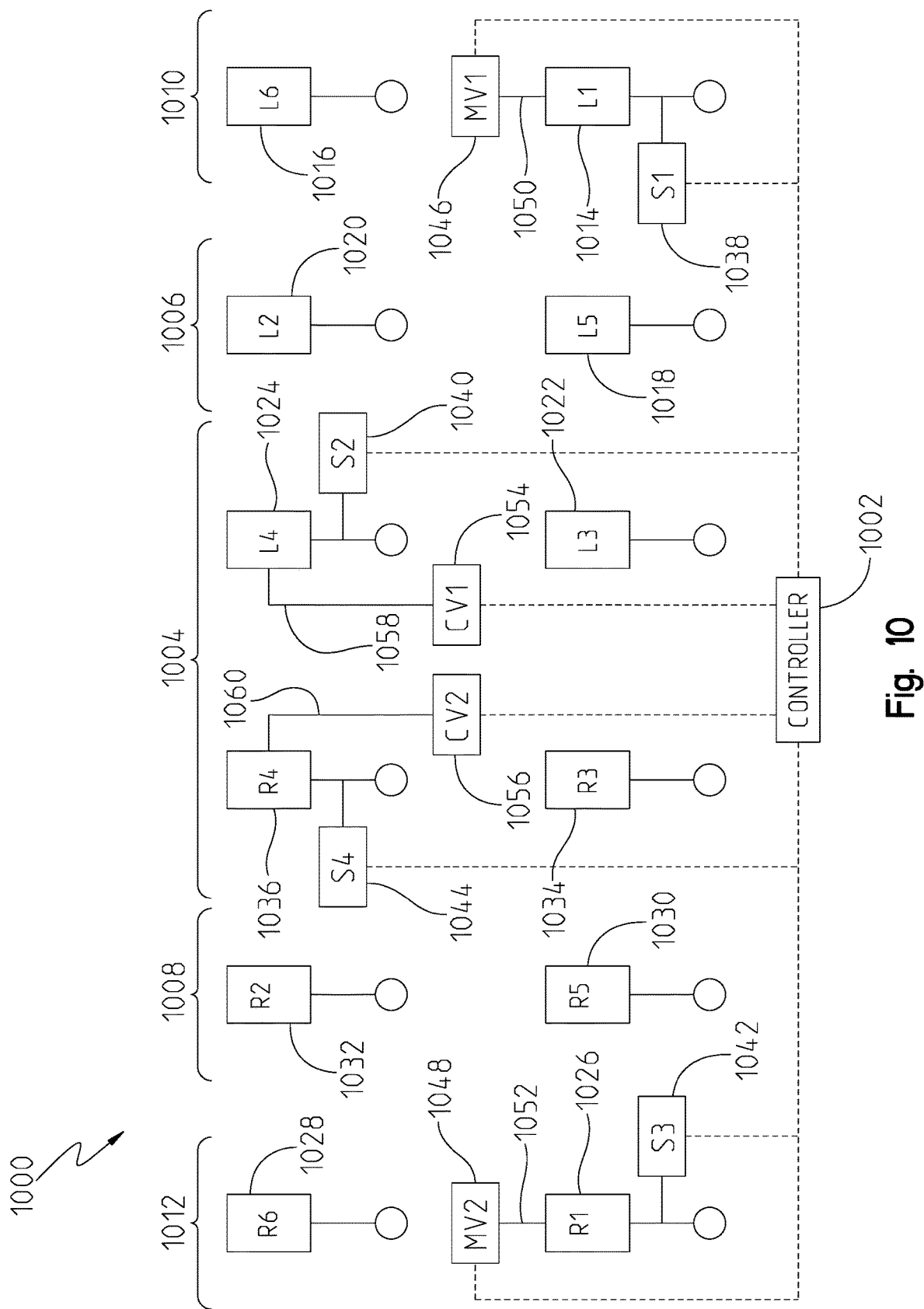
FIG. 10 is a diagram of a control circuit for controlling a hydraulic control system of a work machine and agricultural implement.

In the embodiment of FIGS. 8 and 9, the position sensors are each located on the front of the main or center frame, the first frame section and the second frame section. In FIG. 10, however, the position sensors may be located in an alternating arrangement, i.e., some located on the front of the respective frame section and others located on the rear thereof. This may be due to the additional two frame sections that make up a five section implement.

In FIG. 10, a control system 1000 for operably synchronizing the two halves of the implement shown. The control system 1000 includes a controller 1002 which may be located on a tractor (not shown) or the implement. The controller 1002 may include control logic such as John Deere's TruSet™ technology for controlling the synchronization of the implement. Alternatively, the controller 1002 may receive instructions from another controller for controlling synchronization. In this latter example, the other controller may be located on a tractor or remote from the controller 1002.

In any event, the implement may be divided into two halves where each half is hydraulically parallel to one another with no mechanical tie, i.e., the mechanical gang timing link 148 is removed. As will be described, the control system 1000 of FIG. 10 is able to sequence the left and right sides of the implement via master control valves and position sensors further detect a position and communicate the detected position to the controller 1002.

The implement illustrated in FIG. 10 may include a main or center frame 1004, a first frame or inner wing section 1006, a second frame or inner wing section 1008, a third frame or outer wing section 1010, and a fourth frame or outer wing section 1012. A plurality of disc gang assemblies (not shown) may be mounted to the different frame sections. To control gang angle of the respective gang assembly or synchronization of the implement, the control system 1000 includes a plurality of hydraulic actuators. For instance, the main frame 1004 may include a main frame first front actuator 1022, a main frame first rear actuator 1024, a main frame second front actuator 1034, and a main frame second rear actuator 1036. The first frame section 1006 may include a front actuator 1018 and a rear actuator 1020. The second frame section 1008 may include a front actuator 1030 and a rear actuator 1032. Similarly, the third frame section 1010 may include a front actuator 1814 and a rear actuator 1816, and the fourth frame section 1012 may include a front actuator 1826 and a rear actuator 1828.

In the embodiment of FIG. 10, the plurality of actuators may be arranged in a master-slave arrangement similar to that shown and described with respect to FIG. 7 of the present disclosure. Thus, the manner in which the fluid flows through the series of actuators will not be repeated here, but reference is made to FIG. 7 and the description above.

Moreover, as noted above, each half of the implement is in parallel hydraulically with the other. For sake of clarity, one half of the implement may include the main frame first front actuator 1022, the main frame first rear actuator 1024, the first frame front actuator 1018, the first frame rear actuator 1020, the third frame front actuator 1014, and the third frame rear actuator 1016. Each of these actuators are fluidly coupled in series with one another and arranged in a master-slave arrangement with the third frame front actuator 1014 being the master actuator. This comprises a first half of the implement.

The other half of the implement includes the main frame second front actuator 1034, the main frame second rear actuator 1036, the second frame front actuator 1030, the second frame rear actuator 1032, the fourth frame front actuator 1026, and the fourth frame rear actuator 1028. Each of these actuators are fluidly coupled in series with one another and arranged in a master-slave arrangement with the fourth frame front actuator 1026 being the master actuator. This comprises a second half of the implement. The first half and second half of the implement are fluidly coupled to a supply with each half being hydraulically parallel to each other.

Similar to the embodiment of FIGS. 8 and 9, the control system 1000 of FIG. 10 may also include a first master control valve 1046 and a second master control valve 1048. Similar to the previous embodiment, the controller 1002 operably actuates the control valves to an open position to allow hydraulic fluid to flow from a supply line to a master actuator in the corresponding series. For example, the controller 1002 may actuate the first master control valve 1046 to an open position thereby allowing fluid to flow through the first master control valve 1046 and to the fourth frame front actuator 1014 via flow path 1050. Likewise, the controller 1002 may actuate the second master control valve 1048 to an open position thereby allowing fluid to flow through the second master control valve 1048 and to the fifth frame front actuator 1026 via flow path 1052. In this embodiment, the first and second master control valves may be normally closed. In another embodiment, the control valves may be normally open.

Moreover, a plurality of position sensors may be coupled to the different frame sections for detecting a position of the respective frame section and communicating the position to the controller 1002. As shown, a first position sensor 1038 may be coupled to a rod end of the front actuator 1014 of the fourth frame section 1010 and a second position sensor 1040 may be coupled to a rod end of the main frame first rear actuator 1024. Each position sensor is electrically coupled to the controller 1002.

Further, a third position sensor 1042 may be coupled to a rod end of the front actuator 1026 of the fifth frame section 1012, and a fourth position sensor 1044 may be coupled to a rod end of the main frame second rear actuator 1036. These position sensors are also in electrical communication with the controller 1002. In one embodiment, the positions sensors may be a rotary potentiometer that measures a gang angle or position of the frame section via a four-bar linkage (not shown).

In the embodiment of FIG. 10, the control system 1000 may also include a first correction valve 1054 and a second correction valve 1056 to correct for any drift. Both correction valves may be disposed in electrical communication with the controller 1002. The first correction valve 1054 may be fluidly coupled between the main frame first front actuator 1022 and the main frame first rear actuator 1024, and the second correction valve 1056 may be fluidly coupled between the main frame second front actuator 1034 and the main frame second rear actuator 1036.

When the controller 1002 actuates the first correction valve 1054 to an open position, hydraulic fluid that normally flows from the main frame first front actuator 1022 to the main frame first rear actuator 1024 may instead exhaust or bleed through the first correction valve 1054 via exhaust line 1058 and return to the supply line (not shown). Similarly, when the controller 1002 actuates the second correction valve 1056 to an open position, hydraulic fluid that normally flows from the main frame second front actuator 1034 to the main frame second rear actuator 1036 may instead exhaust or bleed through the second correction valve 1056 via exhaust line 1060 and return to the supply line.

In the embodiment of FIG. 10, each master actuator is located on the outermost wing of the implement and each correction valve is located on the main frame. This is similar to the embodiments of FIGS. 8 and 9 where both master control valves are located on the outer wing frames and the correction valves are located on the main frame. However, in FIGS. 8 and 9, the master control valves and correction valves are fluidly coupled to actuators on the front of the respective frame section, whereas in FIG. 10 the master control valves 1046, 1048 are fluidly coupled to front actuators on the outer wing sections but the correction valves are fluidly coupled to both rear actuators on the main frame 1004.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural implement, comprising:
   a transversely extending frame forming at least a first frame section, a second frame section, and a third frame section, where the first frame section is disposed between the second and third frame sections;
   a pair of elongated, generally end-to-end gang assemblies on the first frame section, an elongated gang assembly on the second frame section, and an elongated gang assembly on the third frame section, each of the gang assemblies including a plurality of rotatable tillage tools mounted in such a manner that their axes of rotation extend substantially transverse to a path of travel of the frame;
   each of the gang assemblies being horizontally adjustable relative to the frame for adjusting the angles between the path of travel of the frame and the axes of rotation of the tools;
   a hydraulic actuator for each gang assembly for operably controlling the angular adjustment of the gang assemblies; and
   a fluid source for supplying hydraulic fluid to the hydraulic actuators;
   wherein, the hydraulic actuator on the second frame section comprises a master hydraulic actuator for one of the hydraulic actuators on the first frame section, and the hydraulic actuator on the third frame section comprises a master hydraulic actuator for the other hydraulic actuator on the first frame section.

2. The implement of claim 1, wherein the fluid source is fluidly coupled in series with each of the hydraulic actuators.

3. The implement of claim 1, wherein:
   each hydraulic actuator comprises a cylinder and piston rod that extends and retracts within a bore of the cylinder;
   each cylinder comprises equal bore size.

4. The implement of claim 1, further comprising a gang linkage operably interconnected between the pair of gang assemblies on the first frame section for synchronizing the pair of gang assemblies during their angular adjustment.

5. The implement of claim 1, further comprising:
   a reservoir of hydraulic fluid disposed in fluid communication with the fluid source; and
   a fluid path defined between the fluid source and the reservoir;
   wherein, hydraulic fluid flows through the flow path such that the hydraulic fluid is directly supplied to a hydraulic actuator on the second frame section and a hydraulic actuator on the third frame section, and hydraulic fluid flows to the reservoir via a return line directly fluidly coupled to another hydraulic actuator on the second frame section and another hydraulic actuator on the third frame section.

6. An agricultural implement, comprising:
   a transversely extending frame forming at least a first frame section, a second frame section, and a third frame section, where the first frame section is disposed between the second and third frame sections;
   a front pair of elongated, generally end-to-end gang assemblies on the first frame section, a rear pair of elongated, generally end-to-end gang assemblies on the first frame section, a front elongated gang assembly on the second frame section, a rear elongated gang assembly on the second frame section, a front elongated gang assembly on the third frame section, and a rear elongated gang assembly on the third frame section, each of the gang assemblies including a plurality of rotatable tillage tools mounted in such a manner that their axes of rotation extend substantially transverse to a path of travel of the frame;
   each of the gang assemblies being horizontally adjustable relative to the frame for adjusting the angles between the path of travel of the frame and the axes of rotation of the tools;
   a hydraulic actuator for each gang assembly for operably controlling the angular adjustment of the gang assemblies; and
   a fluid source for supplying hydraulic fluid to the hydraulic actuators;
   wherein, one of the hydraulic actuators on the second frame section comprises a master hydraulic actuator for two of the four hydraulic actuators on the first frame section, and one of the hydraulic actuators on the third frame section comprises a master hydraulic actuator for the other two hydraulic actuators on the first frame section.

7. The implement of claim 6, wherein the fluid source is fluidly coupled in series with each of the hydraulic actuators.

8. The implement of claim 6, wherein:
   each hydraulic actuator comprises a cylinder and piston rod that extends and retracts within a bore of the cylinder;
   each cylinder comprises an equal bore size.

9. The implement of claim 6, further comprising a gang linkage operably interconnected between the rear pair of gang assemblies on the first frame section for synchronizing the rear pair of gang assemblies during their angular adjustment.

10. The implement of claim 6, further comprising:
    a reservoir of hydraulic fluid disposed in fluid communication with the fluid source; and
    a fluid path defined between the fluid source and the reservoir;
    wherein, hydraulic fluid flows through the flow path such that the hydraulic fluid is directly supplied to a first hydraulic actuator on the second frame section and a first hydraulic actuator on the third frame section, and hydraulic fluid flows to the reservoir via a return line directly fluidly coupled to a second hydraulic actuator on the second frame section and a second hydraulic actuator on the third frame section.

11. The implement of claim 6, wherein each of the hydraulic actuators for controlling the front gang assemblies on the frame move in an opposite direction for angular adjustment than each of the hydraulic actuators for controlling the rear gang assemblies.

12. The implement of claim 6, further comprising a hydraulic control system comprising the fluid source, a fluid reservoir, the hydraulic actuator for each gang assembly, and a plurality of fluid lines fluidly coupling the fluid source to each hydraulic actuator in series.

13. The implement of claim 12, wherein the hydraulic actuator comprises:
a first hydraulic actuator for controlling angular adjustment of the rear elongated gang assembly on the second frame section;
a second hydraulic actuator for controlling angular adjustment of the front elongated gang assembly on the second frame section;
a third hydraulic actuator for controlling angular adjustment of the rear elongated gang assembly on the third frame section;
a fourth hydraulic actuator for controlling angular adjustment of the front elongated gang assembly on the third frame section;
a fifth hydraulic actuator for controlling angular adjustment of a first front gang assembly of the pair of front elongated gang assemblies on the first frame section;
a sixth hydraulic actuator for controlling angular adjustment of a second front gang assembly of the pair of front elongated gang assemblies on the first frame section;
a seventh hydraulic actuator for controlling angular adjustment of a first rear gang assembly of the pair of rear elongated gang assemblies on the first frame section; and
an eighth hydraulic actuator for controlling angular adjustment of a second rear gang assembly of the pair of rear elongated gang assemblies on the first frame section;
wherein, the first hydraulic actuator is the master hydraulic actuator of the fifth hydraulic actuator, and the third hydraulic actuator is the master hydraulic actuator of the sixth hydraulic actuator.

14. The implement of claim 13, wherein:
the fifth hydraulic actuator is a master hydraulic actuator of the seventh actuator, and the seventh hydraulic actuator is a master hydraulic actuator of the second hydraulic actuator;
the sixth hydraulic actuator is a master hydraulic actuator of the eighth hydraulic actuator, and the eighth hydraulic actuator is a master hydraulic actuator of the fourth hydraulic actuator.

15. The implement of claim 13, further comprising:
a base end and a rod end of each hydraulic actuator;
a first hydraulic fluid path is defined between the rod end of the first hydraulic actuator and the rod end of the fifth hydraulic actuator;
a second hydraulic fluid path is defined between the rod end of the third hydraulic actuator and the rod end of the sixth hydraulic actuator;
a third hydraulic fluid path is defined between the base end of the fifth hydraulic actuator and the base end of the seventh hydraulic actuator; and
a fourth hydraulic fluid path is defined between the base end of the sixth hydraulic actuator and the base end of the eighth hydraulic actuator.

16. The implement of claim 6, wherein each hydraulic actuator is controllably movable between an extended position and a retracted position, and as each of the hydraulic actuators for controlling the front gang assemblies on the frame is disposed in either the extended or retracted position, each of the hydraulic actuators for controlling the rear gang assemblies is disposed in the other position.

17. The implement of claim 6, wherein:
the gang angle is increased when each of the hydraulic actuators for controlling the front gang assemblies on the frame is disposed in the extended position and each of the hydraulic actuators for controlling the rear gang assemblies is disposed in the retracted position; and
the gang angle is decreased when each of the hydraulic actuators for controlling the front gang assemblies on the frame is disposed in the retracted position and each of the hydraulic actuators for controlling the rear gang assemblies is disposed in the extended position.

18. An agricultural implement, comprising:
a transversely extending frame forming at least a first frame section, a second frame section, and a third frame section, where the first frame section is disposed between the second and third frame sections;
a front pair of elongated, generally end-to-end gang assemblies on the first frame section, a rear pair of elongated, generally end-to-end gang assemblies on the first frame section, a front elongated gang assembly on the second frame section, a rear elongated gang assembly on the second frame section, a front elongated gang assembly on the third frame section, and a rear elongated gang assembly on the third frame section, each of the gang assemblies including a plurality of rotatable tillage tools mounted in such a manner that their axes of rotation extend substantially transverse to a path of travel of the frame;
each of the gang assemblies being horizontally adjustable relative to the frame for adjusting the angles between the path of travel of the frame and the axes of rotation of the tools;
a first hydraulic actuator for controlling angular adjustment of the rear elongated gang assembly on the second frame section;
a second hydraulic actuator for controlling angular adjustment of the front elongated gang assembly on the second frame section;
a third hydraulic actuator for controlling angular adjustment of the rear elongated gang assembly on the third frame section;
a fourth hydraulic actuator for controlling angular adjustment of the front elongated gang assembly on the third frame section;
a fifth hydraulic actuator for controlling angular adjustment of a first front gang assembly of the pair of front elongated gang assemblies on the first frame section;
a sixth hydraulic actuator for controlling angular adjustment of a second front gang assembly of the pair of front elongated gang assemblies on the first frame section;
a seventh hydraulic actuator for controlling angular adjustment of a first rear gang assembly of the pair of rear elongated gang assemblies on the first frame section; and
an eighth hydraulic actuator for controlling angular adjustment of a second rear gang assembly of the pair of rear elongated gang assemblies on the first frame section; and
a fluid source for supplying hydraulic fluid to the hydraulic actuators;
wherein, the first hydraulic actuator is the master hydraulic actuator of the fifth hydraulic actuator, and the third hydraulic actuator is the master hydraulic actuator of the sixth hydraulic actuator.

19. The implement of claim 18, wherein each of the first, second, third, fourth, fifth, sixth, seventh, and eighth hydraulic actuators comprise the same bore size.

20. The implement of claim 18, wherein:
- each hydraulic actuator is controllably movable between an extended position and a retracted position, and as the second, fourth, fifth and sixth hydraulic actuators are disposed in either the extended or retracted position, the first, third, seventh and eighth hydraulic actuators are disposed in the other position;
- the gang angle is increased when the second, fourth, fifth and sixth hydraulic actuators are disposed in their extended position and first, third, seventh and eighth hydraulic actuators are disposed in their retracted position; and
- the gang angle is decreased when the second, fourth, fifth and sixth hydraulic actuators are disposed in their retracted position and the first, third, seventh and eighth hydraulic actuators are disposed in their extended position.

* * * * *